US012348774B2

(12) United States Patent
Kadam et al.

(10) Patent No.: US 12,348,774 B2
(45) Date of Patent: Jul. 1, 2025

(54) MULTISCALE INTER-PREDICTION FOR DYNAMIC POINT CLOUD COMPRESSION

(71) Applicants: SONY GROUP CORPORATION, Tokyo (JP); SONY CORPORATION OF AMERICA, New York, NY (US)

(72) Inventors: Pranav Aniruddha Kadam, Sunnyvale, CA (US); Alexandre Zaghetto, San Jose, CA (US); Danillo Bracco Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 12 days.

(21) Appl. No.: 18/471,753

(22) Filed: Sep. 21, 2023

(65) Prior Publication Data
US 2024/0137563 A1 Apr. 25, 2024
US 2024/0236369 A9 Jul. 11, 2024

Related U.S. Application Data

(60) Provisional application No. 63/380,089, filed on Oct. 19, 2022.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/124* (2014.11);
(Continued)

(58) Field of Classification Search
CPC .. H04N 19/597; H04N 19/105; H04N 19/124; H04N 19/30; H04N 19/503; H04N 19/96
(Continued)

(56) References Cited

U.S. PATENT DOCUMENTS

| 10,650,588 B2 | 5/2020 | Hazeghi et al. |
| 2020/0258262 A1* | 8/2020 | Lasserre ................. G06F 17/16 |
| 2023/0105257 A1* | 4/2023 | Qi ......................... G01S 7/4861 |
| | | 702/152 |

FOREIGN PATENT DOCUMENTS

| CN | 112489072 A | 3/2021 |
| WO | 2022/141418 A1 | 7/2022 |

OTHER PUBLICATIONS

Cui, et al., "Cooperative Perception Technology of Autonomous Driving in the Internet of Vehicles Environment: A Review", MDPI, Sensors, Jul. 25, 2022, 31 pages.

(Continued)

*Primary Examiner* — Allen C Wong
(74) *Attorney, Agent, or Firm* — CHIP LAW GROUP

(57) ABSTRACT

An electronic device and method for multiscale inter-prediction for dynamic point cloud compression is provided. The electronic device receives a set of reference point cloud frames and a current point cloud frame. The electronic device generates reference frame data comprising a feature set for each reference point cloud frame and a first set of features for the current point cloud frame. The electronic device predicts a second set of features for the current point cloud frame, using a first neural network predictor, based on the reference frame data. The electronic device computes a set of residual features based on the first set of features and the second set of features. The electronic device generates a set of quantized residual features based on the set of residual features and a bitstream of encoded point cloud data for the
(Continued)

current 3D point cloud frame based on the set of quantized residual features.

20 Claims, 10 Drawing Sheets

(51) Int. Cl.
      *H04N 19/124*     (2014.01)
      *H04N 19/30*      (2014.01)
      *H04N 19/503*     (2014.01)
      *H04N 19/96*      (2014.01)

(52) U.S. Cl.
      CPC ........... *H04N 19/30* (2014.11); *H04N 19/503* (2014.11); *H04N 19/96* (2014.11)

(58) Field of Classification Search
      USPC .................................................. 375/240.12
      See application file for complete search history.

(56) References Cited

OTHER PUBLICATIONS

"MPEG 3DG, V-PCC Test Model", Version 8, ISO/IEC JTC1/SC29/WG11, N18884, 2019.
"MPEG 3DG, G-PCC codec description" Version 4, ISO/IEC JTC1/SC29/ WG11, N18673, 2019.
Wang, et al., "Multiscale Point Cloud Geometry Compression", 2021 Data Compression Conference (DCC), IEEE, Nov. 7, 2020, 10 pages.
Wang, et al., "Sparse Tensor-based Multiscale Representation for Point Cloud Geometry Compression", Computer Vision and Pattern Recognition, Oct. 21, 2022, 17 pages.
Pang, et al., "GRASP-Net: Geometric Residual Analysis and Synthesis for Point Cloud Compression", Image and Video Processing, Sep. 9, 2022, 09 pages.
Huang, et al., "OctSqueeze: Octree-Structured Entropy Model for LiDAR Compression", Proceedings of the IEEE/CVF conference on computer vision and pattern recognition, Jan. 8, 2021, 20 pages.
Que, et al., "VoxelContext-Net: An Octree based Framework for Point Cloud Compression", Proceedings of the IEEE/CVF Conference on Computer Vision and Pattern Recognition, May 5, 2021, 10 pages.
Fan, et al., "D-DPCC: Deep Dynamic Point Cloud Compression via 3D Motion Prediction", Computer Vision and Pattern Recognition, May 2, 2022, 7 pages.
Wang, et al., "SparsePCGCv3: Dynamic SparsePCGC with Inter Frame Prediction", MPEG m60354, Jul. 2022.
Akhtar, et al., "Dynamic Point Cloud Geometry Compression using Sparse Convolutions", MPEG-137, Document: m59617, Apr. 2022.
Choy, et al., "4D Spatio-Temporal ConvNets: Minkowski Convolutional Neural Networks", Proceedings of the IEEE/CVF Conference on Computer Vision and Pattern Recognition, Jun. 13, 2019, 21 pages.
Vaswani, et al., "Attention Is All You Need", 31st Conference on Neural Information Processing Systems, (NIPS 2017), Aug. 2, 2023, 15 pages.
Anique Akhtar (UMKC) et al: "[AI-3DGC] Dynamic Point Cloud Geometry Compression using Sparse Convolutions", 138. MPEG Meeting; Apr. 25-Apr. 29, 2022; Online; (Motion Picture Expert Group or ISO/IEC JTC1/SC29/WG11), No. m59617, Apr. 18, 2022.
Wang Jianqiang et al: "Multiscale Point Cloud Geometry Compression", 2021 Data Compression Conference (DCC), IEEE, Mar. 23, 2021, pp. 73-82.

\* cited by examiner

MULTISCALE INTER-PREDICTION FOR DYNAMIC POINT CLOUD COMPRESSION

CROSS-REFERENCE TO RELATED APPLICATIONS/INCORPORATION BY REFERENCE

This application claims priority to U.S. Provisional Patent Application Ser. No. 63/380,089 filed on Oct. 19, 2022, the entire content of which is hereby incorporated herein by reference.

BACKGROUND

Advancements in the field of dynamic point cloud compression (PCC) have led to the development of approaches that enable efficient representation of data associated with 3D points of a point cloud. Typically, the point cloud may include a large number of unstructured 3D points. Each 3D point may include geometry information and attribute information (for example, color, transparency, reflectance, opacity, texture, material, and so on) associated with the corresponding 3D point. Thus, each 3D point of the point cloud may include a significant amount of data. The point cloud data may require compression (i.e., encoding) using a PCC encoder for storage, processing, or transmission of the point cloud. Subsequently, a PCC decoder may reconstruct the point cloud based on encoded point cloud data received from the PCC encoder. To encode a current point cloud frame, the PCC encoder may generate encoded point cloud data based on the current point cloud frame and a previously decoded point cloud frame. The encoded point cloud data may be transmitted to the PCC decoder that may reconstruct the corresponding point by decoding the encoded point cloud data. The reconstruction of the current point cloud frame based on the encoded point cloud data (generated based on the previously decoded point cloud frame) may be error prone and lead to appearance of artifacts or irregularities in the geometry of the reconstructed point cloud.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for multiscale inter-prediction for dynamic point cloud compression, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
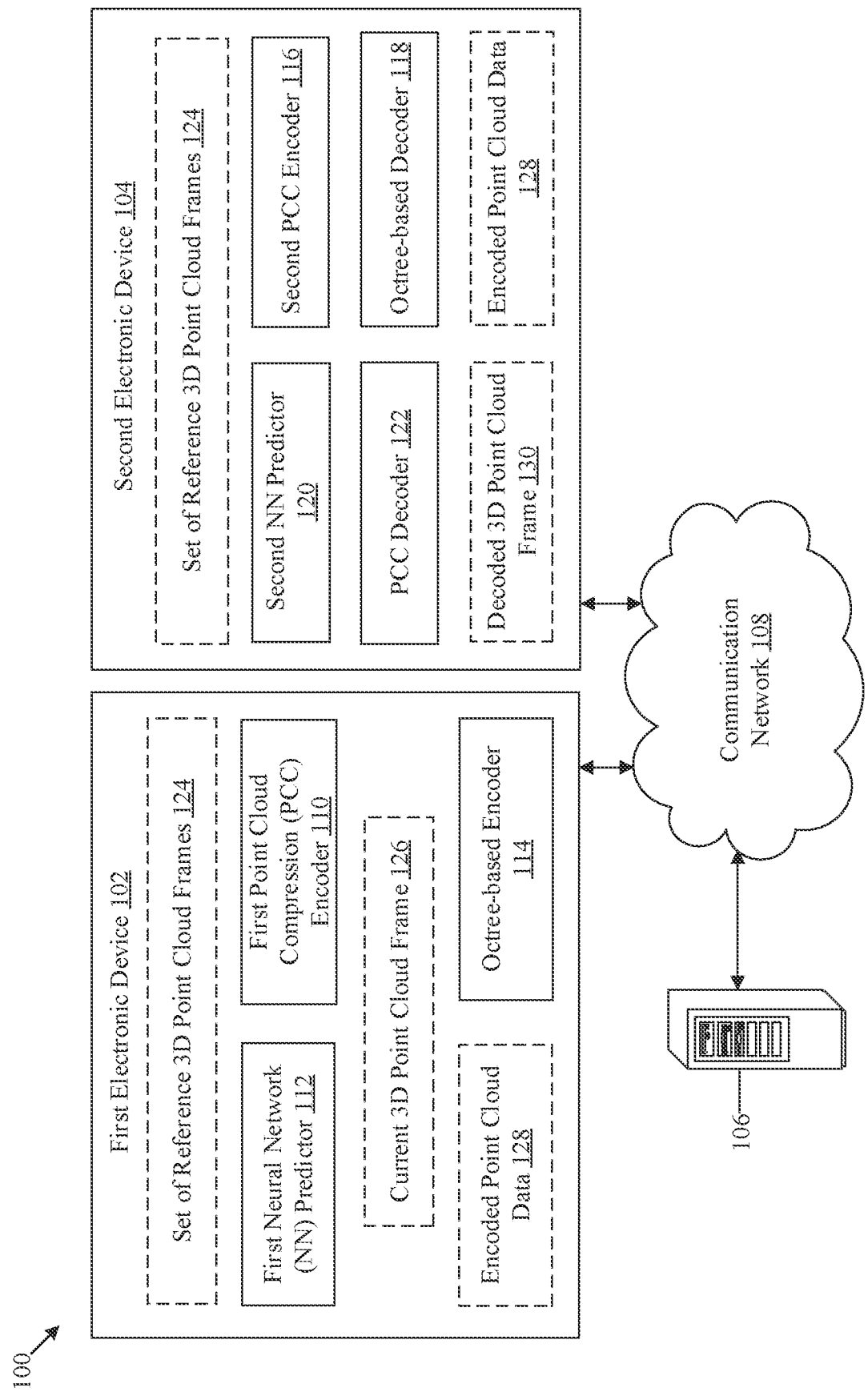
FIG. 1 is a diagram that illustrates an exemplary network environment for multiscale inter-prediction for dynamic point cloud compression, in accordance with an embodiment of the disclosure.

The following described implementations may be found in a disclosed first electronic device, a second electronic device, and a method for multiscale inter-prediction for dynamic point cloud compression. Exemplary aspects of the disclosure provide the first electronic device (for example, a computing device, a gaming console, or a virtual reality goggle) for prediction of features associated with a 3D point cloud frame based on multi-scaled features of reference 3D point cloud frames, and determination of a difference between actual features associated with the 3D point cloud frame and the predicted features. Specifically, the first electronic device may receive a three-dimensional (3D) point cloud sequence that may include a set of reference 3D point cloud frames and a current 3D point cloud frame that is to be encoded. After the reception, the first electronic device may generate reference frame data that may include a feature set associated with 3D points of each reference 3D point cloud frame of the set of reference 3D point cloud frames. The first electronic device may further generate current frame data associated with 3D points of the current 3D point cloud frame. The current frame data may include a first set of features (i.e., a set of actual features) associated with an occupancy of the 3D points in the current 3D point cloud frame. The first electronic device may predict a second set of features associated with the 3D points of the current 3D point cloud frame. The prediction of the second set of features may be based on application of a first neural network predictor on the reference frame data. Based on the generated first set of features and the predicted second set of features, the first electronic device may compute a set of residual features. Thereafter, the first electronic device may generate a set of quantized residual features based on application of a quantization scheme on the set of residual features. Finally, the first electronic device may generate a bitstream of encoded point cloud data for the current 3D point cloud frame based on application of an encoding scheme on the set of quantized residual features.

Exemplary aspects of the disclosure further provide the second electronic device (for example, a computing device, a gaming console, a virtual reality goggle, or a smart wearable device) for prediction of features associated with the current 3D point cloud frame based on multi-scaled features of the set of reference 3D point cloud frames. The current 3D point cloud frame may be reconstructed based on the predicted features and the encoded point cloud data. Specifically, the second electronic device may receive the 3D point cloud sequence that may include the set of reference 3D point cloud frames. After the reception, the second electronic device may generate reference frame data comprising a feature set associated with 3D points of each reference 3D point cloud frame of the set of reference 3D point cloud frames. Thereafter, the second electronic device may receive (from the first electronic device) the bitstream of encoded point cloud data associated with the current 3D point cloud frame that is to be decoded. The second electronic device may predict a third set of features associated with 3D points of the current 3D point cloud frame based on an application of a second neural network predictor on the reference frame data. The second electronic device may generate a fourth set of features associated with the 3D points of the current 3D point cloud frame based on the received bitstream of encoded point cloud data and the predicted third set of features. The second electronic device may generate (i.e., reconstruct) the current 3D point cloud frame based on application of a decoding scheme on the determined fourth set of features.

Typically, a 3D point cloud may be compressed using point cloud compression (PCC) techniques and subsequently reconstructed using decoding techniques. The encoding may be necessary since each 3D point of the 3D point cloud may include a significant amount of point data and transmission of point cloud data via communication channels with limited bandwidth may be infeasible. The encoding may involve predicting features of a current point cloud frame based on features of a previously decoded point cloud frame. Based on the predicted features, a bitstream of encoded point cloud data may be generated. A PCC decoder may reconstruct the current point cloud frame based on the bitstream. However, the reconstructed point cloud frame may include artifacts or surface irregularities if there is a significant difference between the current and previous point cloud frames. To prevent appearance of artifacts or irregularities, a difference between the current point cloud frame and the previously decoded point cloud frame may be determined. The difference may be used for motion estimation of objects in the current point cloud frame with respect to the previously decoded point cloud frame. Based on the motion estimation, another bitstream of encoded point cloud data may be generated. Since multiple bitstreams are generated, there may be a requirement for additional bandwidth resources to transmit the multiple bitstreams of encoded point cloud data to the PCC decoder for a lossless reconstruction or decoding of each point cloud frame.

To address such issues, the first electronic device may perform dynamic point cloud compression based on prediction of latent features associated with a current point cloud frame using multi-scale latent features associated with a set of reference point cloud frames that may precede the current point cloud frame and that have been previously decoded. Further, the second electronic device may determine multi-scale latent features associated with the set of reference point cloud frames and may use the determined multi-scale latent features to reconstruct the current point cloud frame. The determination of the multi-scale features by the first electronic device may facilitate in reducing the size of a bitstream representative of encoded point cloud data associated with the current point cloud frame, thereby reducing transmission throughput. The reduction may be achieved since actual features associated with each point cloud frame may be determined using a PCC encoder at the first electronic device-side, and a residue, generated based on the actual features and the predicted features, may be used for generation of encoded point cloud data. The residue may represent a difference between the actual features and the predicted features. The first electronic device may further compress the residue using an entropy coder and transmit the compressed reside as the encoded point cloud data to the second electronic device. At the second electronic device-side, multi-scale latent features associated with the set of reference point cloud frames may be determined using a PCC encoder. Based on the determined multi-scale latent features associated with the set of reference point cloud frames, latent features associated with the current point cloud frame may be predicted. Thereafter, the received residue may be reconstructed, and the reconstructed residue may be accumulated with the predicted features for determination of the actual features associated with the current point cloud frame at the second electronic device-side. The current point cloud frame may be reconstructed using a PCC decoder at the second electronic device-side, based on the determined actual features.

FIG. 1 is a diagram that illustrates an exemplary network environment for multiscale inter-prediction for dynamic point cloud compression, in accordance with an embodiment of the disclosure. With reference to FIG. 1, there is shown a network environment 100. The network environment 100 includes a first electronic device 102, a second electronic device 104, and a server 106. The first electronic device 102 may communicate with the second electronic device 104 and the server 106, through one or more networks (such as a communication network 108). The first electronic device 102 may include a first point cloud compression (PCC) encoder 110, a first neural network predictor 112, and an octree-based encoder 114. The second electronic device 104 may include a second PCC encoder 116, an octree-based decoder 118, a second neural network predictor 120, and a PCC decoder 122. The first electronic device 102 may receive a set of reference 3D point cloud frames 124 and a current 3D point cloud frame 126 as inputs and may generate, as an output, encoded point cloud data 128 associated with the current 3D point cloud frame 126. The second electronic device 104 may receive the set of reference 3D point cloud frames 124 and the encoded point cloud data 128 as inputs and may generate the decoded 3D point cloud frame 130 as an output.

In FIG. 1, the first electronic device 102 is responsible for encoding of the point cloud data (e.g., a point cloud sequence) and the second electronic device 104 is responsible for decoding and reconstruction of the point cloud data from compressed point cloud representation shared by the first electronic device 102.

In some embodiments, the first electronic device 102 and the second electronic device 104 may be the same device. In such cases, the first electronic device 102 or the second electronic device 104 may be responsible for both encoding and reconstruction of the point cloud data. The first PCC encoder 110 may be same as the second PCC encoder 116, and the first neural network predictor 112 may be same as the second neural network predictor 120.

The first electronic device 102 may include suitable logic, circuitry, interfaces, and/or code that may be configured to receive the set of reference 3D point cloud frames 124, a current 3D point cloud frame 126, and target coordinate information associated with the current 3D point cloud frame 126. The first electronic device 102 may further determine, via the first PCC encoder 110, features associated with each reference 3D point cloud frame of the set of reference 3D point cloud frames 124 and features associated with the current 3D point cloud frame 126. The first electronic device 102 may further predict, via the first neural network predictor 112, features associated with the current 3D point cloud frame 126 based on the features associated with each reference 3D point cloud frame of the set of reference 3D point cloud frames 124. The first electronic device 102 may be further configured to determine a residue based on the features determined by the first PCC encoder 110 and the features predicted by the first neural network predictor 112 and transmit the residue. Examples of the first electronic device 102 may include, but are not limited to, a computing device such as a server, a video-conferencing system, an augmented reality (AR) device, a virtual reality (VR device), a mixed reality (MR) device, a game console, a server, a smart wearable device, a mainframe machine, a computer workstation, and/or a consumer electronic (CE) device.

The second electronic device 104 may include suitable logic, circuitry, interfaces, and/or code that may be configured to receive the set of reference 3D point cloud frames 124, encoded target coordinate information, and the compressed residue. The second electronic device 104 may determine, via the second PCC encoder 116, features associated with each reference 3D point cloud frame of the set of reference 3D point cloud frames 124 and may predict, via the second neural network predictor 120, features associated with the current 3D point cloud frame 126. The second electronic device 104 may further reconstruct (i.e., decode), via the PCC decoder 122, the current 3D point cloud frame 126 to obtain a decoded 3D point cloud frame 130. The reconstruction may be based on the features predicted by the second neural network predictor 120 and the residue. Examples of the second electronic device 104 may include, but are not limited to, a computing device, a video-conferencing system, an AR device, a VR device, a MR device, a game console, a smart wearable device, a server, a mainframe machine, a computer workstation, and/or a CE device.

The server 106 may include suitable logic, circuitry, interfaces, and/or code that may be configured to generate the set of reference 3D point cloud frames 124 of 3D objects in 3D space. The server 106 may be configured use images and depth information of the objects to generate each 3D reference point cloud frame of the set of reference 3D point cloud frames 124. The server 106 may be configured to store the set of reference 3D point cloud frames 124 and information associated with the set of reference 3D point cloud frames 124. The server 106 may be further configured to receive a request from the first electronic device 102 or the second electronic device 104 for the set of reference 3D point cloud frames 124. The server 106 may transmit the set of reference 3D point cloud frames 124 to the first electronic device 102 or the second electronic device 104 based the request. In some embodiments, the server 106 may include the first PCC encoder 110, the first neural network predictor 112, the octree-based encoder 114, the second PCC encoder 116, the octree-based decoder 118, the second neural network predictor 120, and the PCC decoder 122.

The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof. In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the first electronic device 102 as two separate entities, the server 106 and the second electronic device 104 as two separate entities, or the server 106, the first electronic device 102, and the second electronic device 104 as three separate entities. In some embodiments, the functionalities of the server 106 may be incorporated in its entirety or at least partially in the first electronic device 102 or the second electronic device 104, without a departure from the scope of the disclosure.

The communication network 108 may include a communication medium through which the first electronic device 102, the second electronic device 104, and the server 106 may communicate with each other. The communication network 108 may be a wired or wireless communication network. Examples of the communication network 108 may include, but are not limited to, Internet, a Wireless Fidelity (Wi-Fi) network, a Personal Area Network (PAN), a Local Area Network (LAN), or a Metropolitan Area Network (MAN). The first electronic device 102 and the second electronic device 104 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Each of the first PCC encoder 110 and the second PCC encoder 116 may include suitable logic, circuitry, interfaces, and/or code that may be configured to encode each reference 3D point cloud frame of the set of reference 3D point cloud frames 124 to generate a feature set associated with 3D points of a corresponding reference 3D point cloud frame of the set of reference 3D point cloud frames 124. The first PCC encoder 110 may be further configured to encode the current 3D point cloud frame 126 to generate a first set of features associated with 3D points in the current 3D point cloud frame 126.

Each of the first PCC encoder 110 and the second PCC encoder 116 may be implemented as a Deep Neural Network (includes model file and associated inference code) that can be executed on a Graphical Processing Unit (GPU), a Central Processing Unit (CPU), a Tensor Processing Unit (TPU), a Reduced Instruction Set Computing (RISC), Application-Specific Integrated Circuit (ASIC), or a Complex Instruction Set Computing (CISC) processor, a co-processor, and/or a combination thereof. In some embodiments, the first PCC encoder 110 may be implemented as a Deep Neural Network on a specialized hardware interfaced with other computational circuitries of the first electronic device 102. Similarly, the second PCC encoder 116 may be implemented as a Deep Neural Network on a specialized hardware interfaced with other computational circuitries of the second electronic device 104. In such implementations, the first PCC encoder 110 and the second PCC encoder 116 may be associated with a specific form factor on a specific computational circuitry. Examples of the specific computational circuitry may include, but are not limited to, a field programmable gate array (FPGA), programmable logic devices (PLDs), an ASIC, a programmable ASIC (PL-ASIC), application specific integrated parts (ASSPs), and a System-on-Chip (SOC) based on standard microprocessors (MPUs) or digital signal processors (DSPs). In accordance with an embodiment, the first PCC encoder 110 or the second PCC encoder 116 may be also interfaced with a GPU to parallelize operations of the first PCC encoder 110 or the second PCC encoder 116 respectively.

Each of the first neural network predictor 112 and the second neural network predictor 120 may be referred to as a neural network that is a computational network or a system of artificial neurons that may typically be arranged in a plurality of layers. The neural network may be defined by its hyper-parameters, for example, activation function(s), a number of weights, a cost function, a regularization function, an input size, a number of layers, and the like. Further, the layers may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from the hyper-parameters of the neural network. Such hyper-parameters may be set before or after training of the neural network.

Each node may correspond to a mathematical function (e.g., a sigmoid function or a rectified linear unit) with parameters that are tunable during training of the neural network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function. In training of the neural network, one or more parameters of each node of the neural network may be updated based on whether an output of the final layer for a given input (from the training dataset) matches a correct result in accordance with a loss function for the neural network. The above process may be repeated for the same or a different input until a minimum of the loss function is achieved, and a training error is minimized. Several methods for training are known in art, for example, gradient descent, stochastic gradient descent, batch gradient descent, gradient boost, meta-heuristics, and the like.

Each of the first neural network predictor 112 and the second neural network predictor 120 may be a machine learning model that is trained to generate multi-scale features associated with an input 3D point cloud frame. Each of the first neural network predictor 112 and the second neural network predictor 120 may receive, as an input, the feature set associated with 3D points of each reference 3D point cloud frame of the set of reference 3D point cloud frames 124 and the target coordinate information associated with the current 3D point cloud frame 126. Each of the first neural network predictor 112 and the second neural network predictor 120 may generate a prediction as an output in response to the input. The prediction may be indicative of features associated with the current 3D point cloud frame 126. The first neural network predictor 112 may predict a second set of features associated with the current 3D point cloud frame 126 based on application of the first neural network predictor 112 on the feature set (generated by the first PCC encoder 110) and the target coordinate information. The second neural network predictor 120 may predict a third set of features associated with the current 3D point cloud frame 126 based on an application of the second neural network predictor 120 on the feature set (generated by the second PCC encoder 116) and the target coordinate information (decoded by the octree-based decoder 118).

In some embodiments, each of the first neural network predictor 112 and the second neural network predictor 120 may include electronic data, which may be implemented as a software component of an application executable on the first electronic device 102 and the second electronic device 104. Each of the first neural network predictor 112 and the second neural network predictor 120 may rely on libraries, external scripts, or logic/instructions for execution by a processing device included in the first electronic device 102 and the second electronic device 104. In one or more embodiments, each of the first neural network predictor 112 and the second neural network predictor 120 may be implemented using hardware that may include a processor, a microprocessor (e.g., to perform or control performance of one or more operations), an FPGA, or an ASIC. Alternatively, in some embodiments, each of the first neural network predictor 112 and the second neural network predictor 120 may be implemented using a combination of hardware and software. Examples of the first neural network predictor 112 and the second neural network predictor 120 may include, but are not limited to, a deep neural network (DNN), a convolutional neural network (CNN), an artificial neural network (ANN), a fully connected neural network, and/or a combination of such networks.

The octree-based encoder 114 may include suitable logic, circuitry, interfaces, and/or code that may be configured to encode data based on using a data structure (i.e., an octree). The octree-based encoder 114 may partition a 3D space (such as a portion of the current 3D point cloud frame 126 that includes 3D points located at target coordinates specified in the target coordinate information) recursively into smaller regions (such as blocks) known as octants. The partitioning may continue until each block satisfies stopping criteria (points within each block represent similar density or texture). In an embodiment, the octree-based encoder 114 may encode partitioning hierarchy information and point cloud data associated with the 3D points located at the target coordinates to generate encoded target coordinate information.

In some embodiments, the octree-based encoder 114 may be a machine-learning-based octree coder which may encode (compress) 3D points at the target coordinates of the current 3D point cloud frame 126 using techniques such as deep-octree coding. Examples of such machine-learning-based octree coders may include, but are not limited to, G-PCC, OctSqueeze, and VoxelContext-Net.

The octree-based decoder 118 may include suitable logic, circuitry, interfaces, and/or code that may be configured to decode the encoded target coordinate information. At each level of an octree (based on which the encoded target coordinate information may be decoded), octants may be reconstructed until the entire volume (i.e., the portion of the current 3D point cloud frame 126 that includes the 3D points located at the target coordinates) is reconstructed. Based on the octants, reconstructed decoded target coordinate information may be obtained.

In some embodiments, the octree-based encoder 114 may be a machine-learning-based octree coder which may decode encoded target coordinate information associated with the current 3D point cloud frame 126 using deep-octree decoding techniques. Examples of such machine-learning-based octree decoders may include, but are not limited to, G-PCC, OctSqueeze, and VoxelContext-Net.

The PCC decoder 122 may include suitable logic, circuitry, and/or interfaces that may be configured to reconstruct the current 3D point cloud frame 126 based on the encoded point cloud data 128. The PCC decoder 122 may receive, as an input, a fourth set of features. The fourth set of features may be generated based on the third set of features and a decompressed residue. Based on an application of the PCC decoder 122 on the fourth set of features, the decoded 3D point cloud frame 130 may be generated. The PCC decoder 122 may be implemented as a Deep Neural Network on a GPU, a CPU, a TPU, a RISC processor, an ASIC processor, a CISC processor, a co-processor, and/or a combination thereof. In some other embodiments, the PCC decoder 122 may be implemented as a Deep Neural Network on a specialized hardware interfaced with other computational circuitries of the second electronic device 104. In such an implementation, the PCC decoder 122 may be associated with a specific form factor on a specific computational circuitry. Examples of the specific computational circuitry may include, but are not limited to, a FPGA, PLDs, an ASIC, a PL-ASIC, ASSPs, and a SOC based on standard MPUs or DSPs. In some embodiments, the PCC decoder 122 may be interfaced with a GPU to parallelize the operations of the PCC decoder 122.

Each of the reference 3D point cloud frames of the set of reference 3D point cloud frames 124 and the current 3D point cloud frame 126 may correspond to a geometrical representation of one or more 3D objects in a 3D environment (e.g., a real-word environment). Each 3D point cloud frame may constitute a set of 3D points located in different positions in accordance with a 3D coordinate system. In accordance with an embodiment, the first electronic device 102 may acquire the set of reference 3D point cloud frames 124 and the current 3D point cloud frame 126 from the server 106. Similarly, the second electronic device 104 may acquire the set of reference 3D point cloud frames 124 from the server 106. Each 3D point in the reference 3D point cloud frame may include geometrical information (i.e., coordinates of a corresponding 3D point in a corresponding reference 3D point cloud frame) and attribute information associated with the corresponding 3D point. The attribute information may include, for example, color information, reflectance information, opacity information, normal vector information, material identifier information, or texture information.

The encoded point cloud data 128 may be generated based on encoding of each reference 3D point cloud frame of the set of reference 3D point cloud frames 124 and the current 3D point cloud frame 126. Additionally, the encoded point cloud data 128 may be generated further based on a prediction of multi-scale features associated with the current 3D point cloud frame 126 and encoding of target coordinate information associated with the current 3D point cloud frame 126. The encoded point cloud data 128 may include the compressed residue (generated based on the generated first set of features and the predicted second set of features) and the encoded target coordinate information. The first electronic device 102 may transmit the encoded point cloud data 128 to the second electronic device 104 as a bitstream.

The decoded 3D point cloud frame 130 may be a reconstructed point cloud frame that may correspond to the current 3D point cloud frame 126. The second electronic device 104 may reconstruct, via the PCC decoder 122, the current 3D point cloud frame 126 based on the encoded point cloud data 128. The reconstruction may be based on a decompression of the compressed residue and an accumulation (i.e., the fourth set of features) of the decompressed residue (i.e., the original generated residue) with the predicted third set of features. The decoded 3D point cloud frame 130 may be generated based on an application of the PCC decoder 122 on the accumulation.

In operation, the first electronic device 102 may be configured to receive a 3D point cloud sequence that may include the set of reference 3D point cloud frames 124 and the current 3D point cloud frame 126 that is to be encoded. In accordance with an embodiment, each reference 3D point cloud frame of the set of reference 3D point cloud frames 124 may be a previously decoded 3D point cloud frame and may precede (i.e., received earlier than) or succeed the current 3D point cloud frame 126 in a timeline of reception of the 3D point cloud sequence.

The first electronic device 102 may be further configured to generate reference frame data that includes a feature set associated with 3D points of each reference 3D point cloud frame of the set of reference 3D point cloud frames 124. The generation of the reference frame data may be performed based on application of the first PCC encoder 110 on each reference 3D point cloud frame of the set of reference 3D point cloud frames 124. The reference frame data may be generated as an output of the first PCC encoder 110. The feature set associated with 3D points of each reference 3D point cloud frame may include reference features associated with occupancy of the 3D points in a corresponding reference 3D point cloud frame of the set of reference 3D point cloud frames 124 and reference coordinate information associated with the 3D points of the corresponding reference 3D point cloud frame. The reference coordinate information may include, for example, coordinates of the 3D points in the corresponding reference 3D point cloud frame.

The first electronic device 102 may be further configured to generate current frame data associated with 3D points of the current 3D point cloud frame 126. The generation of the current frame data may be based on application of the first PCC encoder 110 on the current 3D point cloud frame 126. The generated current frame data may include a first set of features associated with an occupancy of the 3D points in the current 3D point cloud frame 126. The first set of features may be generated as an output of the first PCC encoder 110. The first set of features may be referred to as actual features associated with the 3D points of the current 3D point cloud frame 126. In accordance with an embodiment, the first set of features may include features associated with occupancy of those 3D points whose coordinates are included in the target coordinate information.

The first electronic device 102 may be further configured to predict a second set of features associated with the 3D points of the current 3D point cloud frame 126 based on application of the first neural network predictor 112 on the reference frame data. The feature set associated with the 3D points of each reference 3D point cloud frame of the set of reference 3D point cloud frames 124 may be fed as input to the first neural network predictor 112. It should be noted that each feature set may be associated with those 3D points of a corresponding reference 3D point cloud frame whose coordinates may be included in the reference coordinate information. The feature set may include the reference features associated with the occupancy of the 3D points in the corresponding reference 3D point cloud frame.

In accordance with an embodiment, the first electronic device 102 may provide the coordinate information (i.e., the target coordinate information) associated with 3D points of the current 3D point cloud frame 126 as an input to the first neural network predictor 112. The 3D points may be those 3D points whose features may need to be predicted and coordinates of the 3D points may be included in the target coordinate information. The target coordinate information may include target coordinates included in the current 3D point cloud frame 126. Based on the application of the first neural network predictor 112 on the inputs, the second set of features may be predicted as output of the first neural network predictor 112. The second set of features may include features associated with the occupancy of the 3D points whose coordinates are included in the target coordinate information.

In accordance with an embodiment, the feature set associated with each reference 3D point cloud frame may be down sampled by a scale of 2, 3, . . . , and K for the prediction. For example, the feature set associated with a first reference 3D point cloud frame of the set of reference 3D point cloud frames 124 may be down sampled by a scale of 2, 3, . . . , and K. Thus, (K−1) feature sets may be generated for the first reference 3D point cloud frame. Similarly, (K−1) feature sets may be generated for each of the other reference 3D point cloud frames of the set of reference 3D point cloud frames 124. Thereafter, a spatiotemporal tensor may be constructed for each down sampling scale based on feature sets of all reference 3D point cloud frames down sampled by the same scale. Since the feature set associated with each reference 3D point cloud frame is down sampled by scales of 2, 3, . . . , and K, (K−1) spatiotemporal tensors may be constructed. For example, a first spatiotemporal sensor may be constructed for the down sampling scale "2" using feature sets associated with all reference 3D point cloud frames that are down sampled by the scale of 2. Similarly, a (K−1)$^{th}$ spatiotemporal sensor may be constructed for the down sampling scale "K" using the feature sets associated with all reference 3D point cloud frames 124 that are down sampled by the scale of "K". The construction of the spatiotemporal sensor for a corresponding down sampling scale may be performed based on a spatiotemporal concatenation of the feature sets of all reference 3D point cloud frames that may be down sampled by the corresponding down sampling scale. Thereafter, a spatiotemporal tensor analysis may be performed based on an application of a sparse convolution or self-attention operation on each of the (K−1) spatiotemporal tensors. After the spatiotemporal tensor analysis, each of the down sampled (K−1) spatiotemporal tensors (apart from the spatiotemporal tensor constructed based on the spatiotemporal concatenation of the feature sets down sampled by the scale of K) may be further down sampled. Thereafter, the (K−1) down sampled spatiotemporal tensors may be concatenated for the generation of a multi-scale feature concatenation vector.

Based on the target coordinate information associated with the 3D points of the current 3D point cloud frame 126 and the multi-scale feature concatenation vector, the second set of features associated with the 3D points of the current 3D point cloud frame 126 may be predicted as an output of the first neural network predictor 112. The second set of features may include features associated with those 3D points whose coordinates may be included in the target coordinate information.

The first electronic device 102 may be further configured to compute a set of residual features based on the first set of features (i.e., the current frame data associated with 3D points of the current 3D point cloud frame 126) and the predicted second set of features. In accordance with an embodiment, the first electronic device 102 may compute a difference between the first set of features and the predicted second set of features. The computed difference may indicate an error associated with the second set of features (i.e., features associated with the 3D points of the current 3D point cloud frame 126 that are predicted based on the reference frame data) with respect to the first set of features (i.e., actual features associated with the 3D points of the current 3D point cloud frame 126). Additionally, the difference may correspond to the set of residual features associated with the 3D points of the current 3D point cloud frame 126 whose coordinates may be included in the target coordinate information.

The first electronic device 102 may be further configured to generate a set of quantized residual features based on application of a quantization scheme on the set of residual features. The quantization scheme may be based on an entropy model and may include a set of quantization levels. In accordance with an embodiment, values of each residual feature of the set of residual features may be quantized to a certain quantization level of the set of quantization levels. The set of residual features may be quantized for subsequent compression and encoding of the set of residual features.

The first electronic device 102 may be further configured to generate a bitstream of the encoded point cloud data 128 for the current 3D point cloud frame 126 based on application of an encoding scheme on the generated set of quantized residual features. The encoding scheme may be based on the entropy model (on which the quantization scheme may be based). Based on the encoding scheme, each quantized residual feature of the set of quantized residual features may be compressed for the generation of the encoded point cloud data 128. The bitstream of the encoded point cloud data 128 may constitute a set of compressed quantized residual features.

In accordance with an embodiment, the encoded point cloud data 128 may further include encoded target coordinate information. The target coordinate information may be encoded based on application of the octree-based encoder 114 on the target coordinate information. The first electronic device 102 may be transmit the bitstream of the encoded point cloud data 128 to the second electronic device 104.

In accordance with an embodiment, the second electronic device 104 may be configured to receive (from the first electronic device 102) the encoded point cloud data 128 and the 3D point cloud sequence that may include the set of reference 3D point cloud frames 124. From the encoded point cloud data 128 (i.e., the bitstream generated by the first electronic device 102), the second electronic device 104 may be configured to extract the set of compressed quantized residual features and the encoded target coordinate information. Thereafter, the second electronic device 104 may apply a decoding scheme on the set of compressed quantized residual features for decompression of the set of compressed quantized residual features. The decoding scheme may generate a set of residual features, which may correspond to the set of residual features computed (by the first electronic device 102) based on the first set of features and the predicted second set of features. The second electronic device 104 may apply the octree-based decoder 118 on the encoded target coordinate information for generation of the target coordinate information as an output of the octree-based decoder 118.

The second electronic device 104 may be further configured to generate reference frame data that may include a feature set associated with 3D points of each reference 3D point cloud frame of the set of reference 3D point cloud frames 124. The feature set associated with each reference 3D point cloud frame may be generated based on an application of the second PCC encoder 116 on a corresponding reference 3D point cloud frame. The feature set may be generated as an output of the second PCC encoder 116. The feature associated with each reference 3D point cloud frame may include reference features associated with the occupancy of 3D points of a corresponding reference 3D point cloud frame and reference coordinate information (that includes coordinates of the 3D points of the 3D points of a corresponding reference 3D point cloud frame).

The second electronic device 104 may be further configured to predict a third set of features associated with the 3D points of the current 3D point cloud frame 126 based on application of the second neural network predictor 120 on the reference frame data. The third set of features may be associated with those 3D points whose coordinates may be included in the target coordinate information decoded by the octree-based decoder 118. In accordance with an embodiment, the second neural network predictor 120 may receive the feature set associated with 3D points of each reference 3D point cloud frame of the set of reference 3D point cloud frames 124 (i.e., the output of the second PCC encoder 116) and the target coordinate information (i.e., the output of the octree-based decoder 118) as inputs. Based on the application of the second neural network predictor 120 on the inputs, the third set of features may be predicted as the output of the second neural network predictor 120. The prediction of the third set of features (by the second neural network predictor 120) may be identical to that of the prediction of the second set of features (by the first neural network predictor 112), provided the first neural network predictor 112 and the second neural network predictor 120 are identical. Further, the second set of features and the third set of features may be identical if the first PCC encoder 110 and the second PCC encoder 116 are identical, and the decoded target coordinate information (generated by the octree-based decoder 118) matches the target coordinate information encoded by the octree-based encoder 114.

The second electronic device 104 may be further configured to generate a fourth set of features associated with the 3D points (whose coordinates are included in the target coordinate information) of the current 3D point cloud frame 126 based on the received bitstream of the encoded point cloud data 128 (i.e., the set of residual features that may be generated by the decoding scheme) and the predicted third set of features. In accordance with an embodiment, the set of residual features and the predicted third set of features may be accumulated to generate the fourth set of features. The 3D points of the current 3D point cloud frame 126 may be reconstructed based on an application of the PCC decoder 122 on the fourth set of features. The PCC decoder 122 may generate the decoded 3D point cloud frame 130 as an output. The decoded 3D point cloud frame 130 may be a reconstructed version of the current 3D point cloud frame 126.

Figure 2:
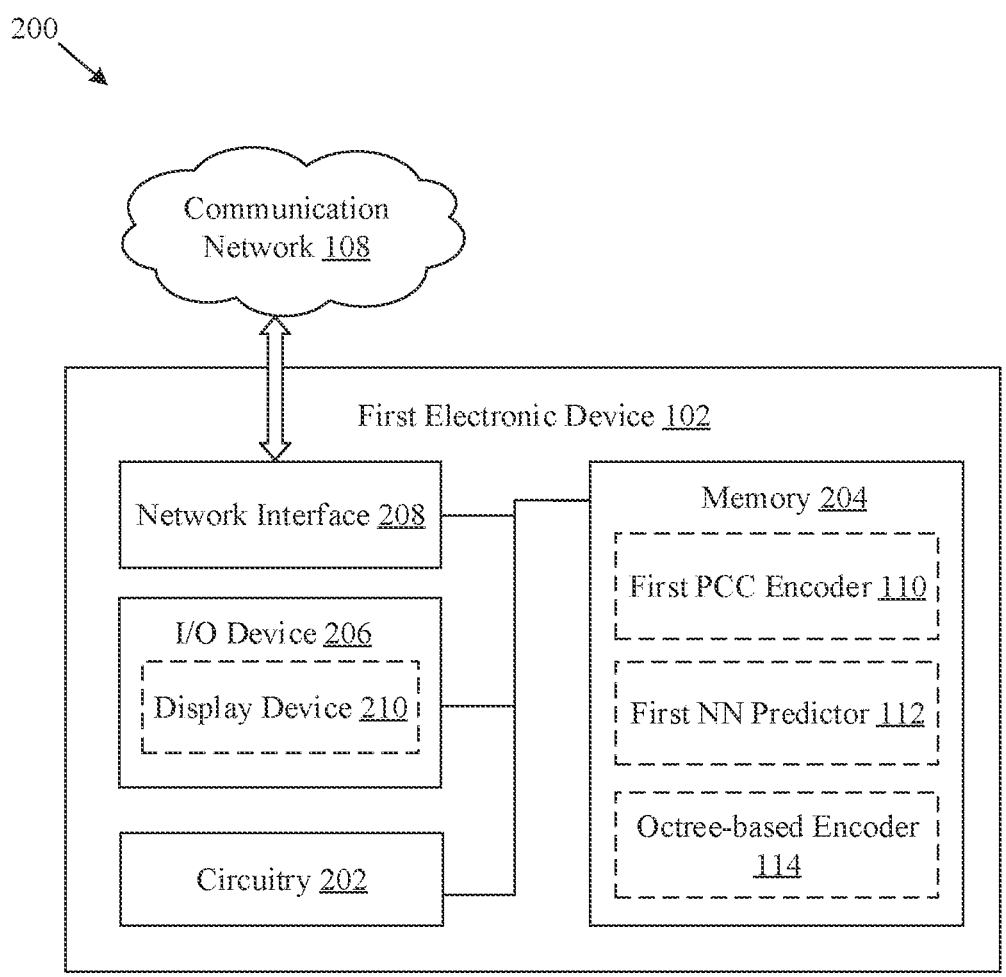
FIG. 2 is a block diagram that illustrates an exemplary first electronic device for multiscale inter-prediction for dynamic 3D point cloud frame compression, in accordance with an embodiment of the disclosure.

FIG. 2 is a block diagram that illustrates an exemplary first electronic device for multiscale inter-prediction for dynamic 3D point cloud frame compression, in accordance with an embodiment of the disclosure. FIG. 2 is explained in conjunction with elements from FIG. 1. With reference to FIG. 2, there is shown a block diagram 200 of the first electronic device 102. The first electronic device 102 may include circuitry 202, a memory 204, an input/output (I/O) device 206, and a network interface 208. In at least one embodiment, the memory 204 may include the first PCC encoder 110, the first neural network predictor 112, and the octree-based encoder 114. In at least one embodiment, the I/O device 206 may include a display device 210. The circuitry 202 may be communicatively coupled to the memory 204, the I/O device 206, and the network interface 208, through wired or wireless communication of the first electronic device 102.

The circuitry 202 may include suitable logic, circuitry, and interfaces that may be configured to execute program instructions associated with different operations to be executed by the first electronic device 102. The circuitry 202 may include one or more processing units, which may be implemented as an integrated processor or a cluster of processors that perform the functions of the one or more specialized processing units, collectively. The circuitry 202 may be implemented based on a number of processor technologies known in the art. Examples implementations of the circuitry 202 may be an x86-based processor, a GPU, a CPU, a RISC processor, an ASIC processor, a CISC processor, a microcontroller, and/or other computing circuits.

The memory 204 may include suitable logic, circuitry, and/or interfaces that may be configured to store instructions executable by the circuitry 202. The memory 204 may be configured to store operating systems and associated applications. The memory 204 may be further configured to store the 3D point cloud sequence, the generated reference frame data, the generated current frame data, the coordinate information associated with the 3D points of the current 3D point cloud frame 126, the second set of features, the set of residual features, the set of quantized residual features, the bitstream of the encoded point cloud data 128, and the like. In at least one embodiment, the first PCC encoder 110, the first neural network predictor 112, and the octree-based encoder 114, included in the memory 204 may be implemented as a combination of programmable instructions stored in the memory 204 or logical units (i.e., programmable logic units) on a hardware circuitry of the first electronic device 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive a user input that may trigger the reception of the 3D point cloud sequence or transmission of the bitstream of the encoded point cloud data 128. The I/O device 206 may be further configured to provide an output in response to the user input. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include the display device 210.

The display device 210 may include suitable logic, circuitry, interfaces, and/or code that may be configured to render each reference 3D point cloud frame of the set of reference 3D point cloud frames included in the 3D point cloud sequence onto a display screen of the display device 210. In accordance with an embodiment, the display device 210 may include a touch screen to receive the user input. The display device 210 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 210 may refer to a display screen of smart-glass device, a 3D display, a see-through display, a projection-based display, an electro-chromic display, and/or a transparent display.

The network interface 208 may include suitable logic, circuitry, interfaces, and/or code that may be configured to establish a communication between the first electronic device 102, the second electronic device 104, and the server 106, via the communication network 108. The network interface 208 may be implemented by use of various known technologies to support wired or wireless communication of the first electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions or operations executed by the first electronic device 102, as described in FIG. 1, may be performed by the circuitry 202. Operations executed by the circuitry 202 are described in detail, for example, in FIGS. 3, 4, 5, 6, 7A, 7B, and 8.

Figure 3:
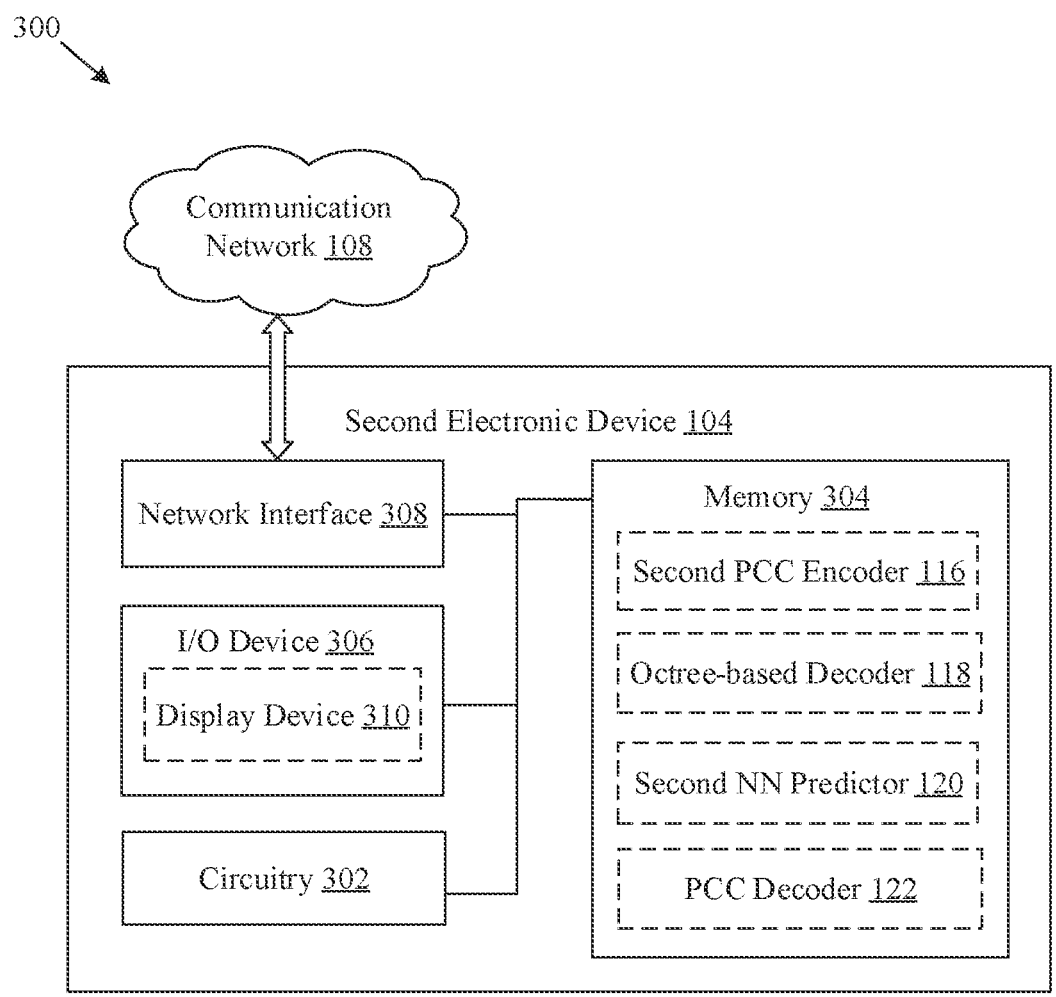
FIG. 3 is a block diagram that illustrates an exemplary second electronic device for multiscale inter-prediction for 3D point cloud frame reconstruction, in accordance with an embodiment of the disclosure.

FIG. 3 is a block diagram that illustrates an exemplary second electronic device for multiscale inter-prediction for 3D point cloud frame reconstruction, in accordance with an embodiment of the disclosure. FIG. 3 is explained in conjunction with elements from FIG. 1. With reference to FIG. 3, there is shown a block diagram 300 of the second electronic device 104. The second electronic device 104 may include circuitry 302, a memory 204, an I/O device 306, and a network interface 308. In an embodiment, the memory 304 may include the second PCC encoder 116, the octree-based decoder 118, the second neural network predictor 120, and the PCC decoder 122. In at least one embodiment, the I/O device 306 may include a display device 310. The circuitry 302 may be communicatively coupled to the memory 304, the I/O device 306, and the network interface 308, through wired or wireless communication of the second electronic device 104.

The circuitry 302 may include suitable logic, circuitry, and interfaces that may be configured to execute program instructions associated with different operations to be executed by the second electronic device 104. The circuitry 302 may include one or more processing units, which may be implemented as an integrated processor or a cluster of processors that perform the functions of the one or more specialized processing units, collectively. The circuitry 302 may be implemented based on a number of processor technologies known in the art. Examples of implementations of the circuitry 302 may be an x86-based processor, a GPU, a RISC processor, an ASIC processor, a CISC processor, a microcontroller, a CPU, and/or other computing circuits.

The memory 304 may include suitable logic, circuitry, and/or interfaces that may be configured to store instructions executable by the circuitry 302. The memory 304 may be configured to store operating systems and associated applications. The memory 304 may be further configured to store the 3D point cloud sequence, the reference frame data, decoded coordinate information associated with the 3D points of the current 3D point cloud frame to be decoded, the predicted third set of features, a decompressed set of residual features, and the 3D decoded point cloud frame 130. In at least one embodiment, the second PCC encoder 116, the octree-based decoder 118, the second neural network predictor 120, and the PCC decoder 122, included in the memory 304, are implemented as a combination of programmable instructions stored in the memory 304 or logical units (i.e., programmable logic units) on a hardware circuitry of the second electronic device 104. Examples of implementation of the memory 304 may include, but are not limited to, RAM, ROM, EEPROM, HDD, a SSD, a CPU cache, and/or a SD card.

The I/O device 306 may include suitable logic, circuitry, interfaces, and/or code that may be configured to receive a user input that may trigger the reception of the 3D point cloud sequence and the bitstream of the encoded point cloud data 128. The I/O device 306 may be further configured to provide an output in response to the user input. The I/O device 306 may include various input and output devices, which may be configured to communicate with the circuitry 302. Examples of the input devices may include, but are not limited to, a touch screen, a keyboard, a mouse, a joystick, and/or a microphone. Examples of the output devices may include the display device 310.

The display device 310 may include suitable logic, circuitry, interfaces, and/or code that may be configured to render each reference 3D point cloud frame of the set of reference 3D point cloud frames and the decoded 3D point cloud frame 130 onto a display screen of the display device 310. In accordance with an embodiment, the display device 310 may include a touch screen to receive the user input. The display device 310 may be realized through several known technologies such as, but not limited to, an LCD display, a LED display, a plasma display, and/or an OLED display technology, and/or other display technologies. In accordance with an embodiment, the display device 310 may refer to a display screen of smart-glass device, a 3D display, a see-through display, a projection-based display, an electro-chromic display, and/or a transparent display.

The network interface 308 may include suitable logic, circuitry, interfaces, and/or code that may be configured to establish a communication between the first electronic device 102, the second electronic device 104, and the server 106, via the communication network 108. The network interface 308 may be implemented by use of various known technologies to support wired or wireless communication of the second electronic device 104 with the communication network 108. The network interface 308 may include, but is not limited to, an antenna, a RF transceiver, one or more amplifiers, a tuner, one or more oscillators, a digital signal processor, a CODEC chipset, a SIM card, and/or a local buffer.

The network interface 308 may communicate via wireless communication with networks, such as the Internet, an Intranet and/or a wireless network, such as a cellular telephone network, a wireless LAN and/or a MAN. The wireless communication may use any of a plurality of communication standards, protocols, and technologies, such as GSM, EDGE, W-CDMA, LTE, 5G NR, CDMA, TDMA, Bluetooth, Wi-Fi (such as IEEE 802.11a, IEEE 802.11b, IEEE 802.11g and/or IEEE 802.11n), VoIP, Li-Fi, Wi-MAX, a protocol for email, instant messaging, and/or SMS.

The functions or operations executed by the second electronic device 104, as described in FIG. 1, may be performed by the circuitry 302. Operations executed by the circuitry 302 are described in detail, for example, in FIGS. 4, 5, 6, 7A, 7B, and 8.

Figure 4:
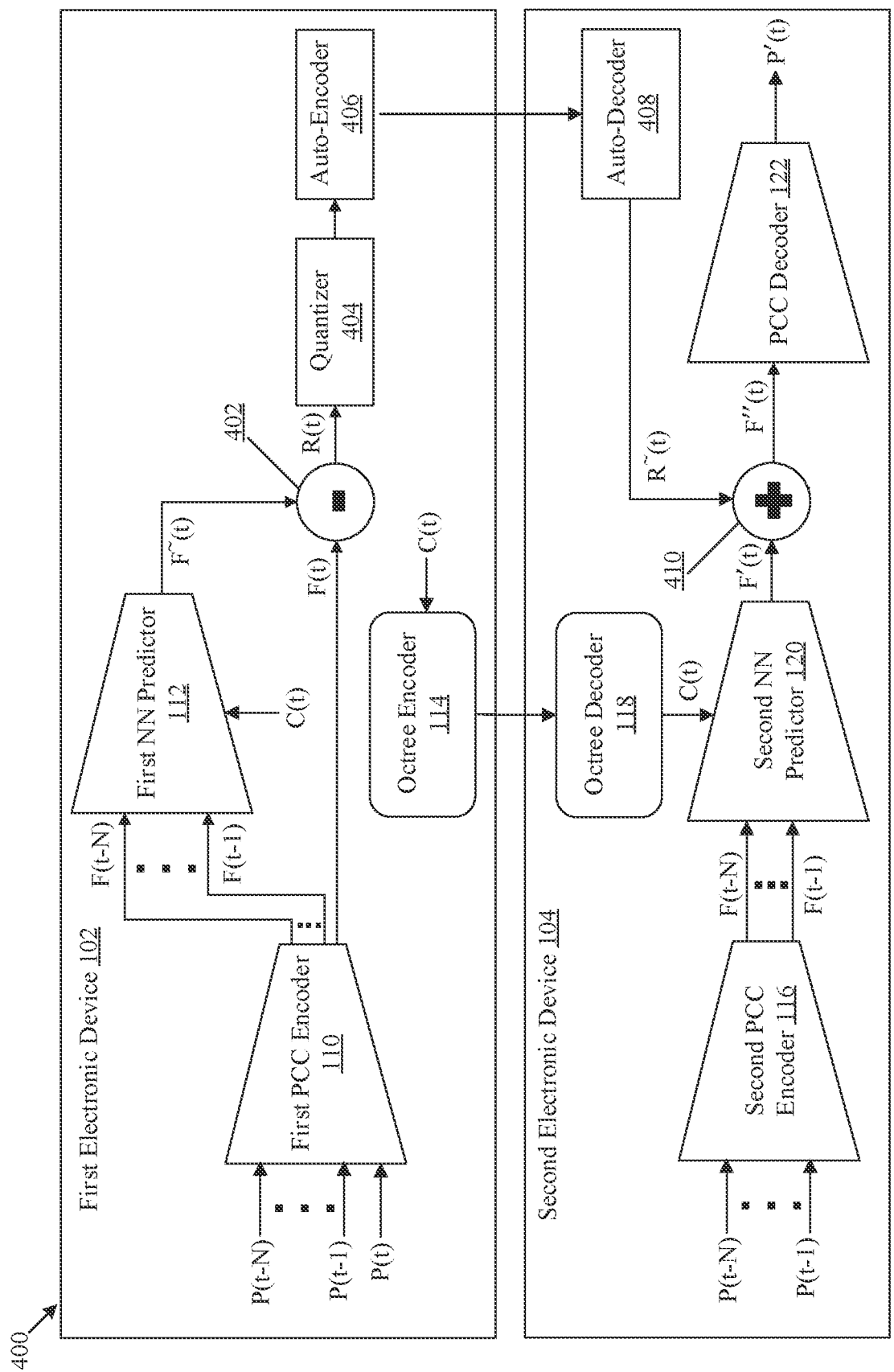
FIG. 4 is a diagram that illustrates an exemplary architecture for multiscale inter-prediction for dynamic 3D point cloud compression and 3D point cloud reconstruction, in accordance with an embodiment of the disclosure.

FIG. 4 is a diagram that illustrates an exemplary architecture for a multiscale inter-prediction for dynamic 3D point cloud compression and 3D point cloud reconstruction, in accordance with an embodiment of the disclosure. FIG. 4 is explained in conjunction with elements from FIG. 1, FIG. 2, and FIG. 3. With reference to FIG. 4, there is shown an exemplary architecture 400 for dynamic 3D point cloud compression and 3D point cloud reconstruction. In the architecture 400, there is shown the first PCC encoder 110, the first neural network predictor 112, the octree-based encoder 114, the second PCC encoder 116, the octree-based decoder 118, the second neural network predictor 120, and the PCC decoder 122, a subtractor 402, a quantizer 404, an auto-encoder 406, an auto-decoder 408, and an accumulator 410.

At any time-instant, the first PCC encoder 110 may receive a set of reference 3D point cloud frames and a current 3D point cloud frame, i.e., P(t), that is to be encoded. The set of reference 3D point cloud frames may include "N" 3D point cloud frames, i.e., P(t–1), P(t–2), . . . , and P(t–N). The set of reference 3D point cloud frames, i.e., P(t–1), P(t–2), . . . , or P(t–N) may precede or succeed the current 3D point cloud frame. In some instances, such frames may be referred to as previously decoded 3D point cloud frames (i.e., frames decoded prior to the reception of the current 3D point cloud frame). The set of reference 3D point cloud frames and the current 3D point cloud frame may be received (by the first PCC encoder 110) as inputs. The first PCC encoder 110 may generate reference frame data and current frame data as respective outputs. The reference frame data may include a feature set associated with 3D points of each reference 3D point cloud frame of the set of reference 3D point cloud frames. For example, an output feature set associated with the 3D points of the input reference 3D point cloud frame P(t–1) may be F(t–1). Similarly, an output feature set associated with the 3D points of the input reference 3D point cloud frame P(t–N) may be F(t–N). The feature set (such as F(t–1)) associated with 3D points of each reference 3D point cloud frame (such as P(t–1)) of the set of reference 3D point cloud frames may include reference features associated with occupancy of the 3D points in a corresponding reference 3D point cloud frame and reference coordinate information associated with coordinates of the 3D points of the corresponding reference 3D point cloud frame. The current frame data may be associated with 3D points of the current 3D point cloud frame (i.e., P(t)) and may include a first set of features, i.e., F(t). The first set of features may be associated with an occupancy of 3D points in the current 3D point cloud frame and may be generated as an output of the first PCC encoder 110. In accordance with an embodiment, the 3D points may be points of the current 3D point cloud frame that may need to be encoded.

The first neural network predictor 112 may receive the feature set associated with 3D points of each reference 3D point cloud frame of the set of reference 3D point cloud frames (i.e., F(t–1) . . . F(t–N)) as an input. The feature set associated with the 3D points of each reference 3D point cloud frame of the set of reference 3D point cloud frames may be down sampled by at least one scaling factor. In accordance with an embodiment, the feature set associated with the 3D points (whose coordinates of the 3D points may be included in the reference coordinate information) of each reference 3D point cloud frame may be down sampled by scaling factors such as 2, 3, . . . , and K. For example, F(t–1) may be down sampled by a scaling factor of 2, 3, . . . , and K for generation of multi-scale feature set $F^2(t-1)$, $F^3(t-1)$, . . . , and $F^K(t-1)$, respectively. Similarly, F(t–N) may be down sampled for generation of multi-scale feature set $F^2(t-N)$, $F^3(t-N)$, . . . , and $F^K(t-N)$.

For each scaling factor (i.e., 2, 3, . . . , or K), the first neural network predictor 112 may generate a spatiotemporal tensor using the feature sets associated with all reference 3D point cloud frames of the set of reference 3D point cloud frames. For example, for scaling factor "2", a spatiotemporal tensor may be generated based on $F^2(t-1)$, . . . , and $F^2(t-N)$. Similarly, for scaling factor "K", a spatiotemporal tensor may be generated based on $F^K(t-1)$, . . . , and $F^K(t-N)$. In accordance with an embodiment, the generation of the spatiotemporal tensor for a certain scaling factor may be based on a spatiotemporal concatenation of the feature sets associated with all reference 3D point cloud frames of the set of reference 3D point cloud frames that are down sampled by the same scaling factor. For example, the spatiotemporal tensor for scaling factor "2" may be constructed based on a spatiotemporal concatenation of $F^2(t-1)$, . . . , and $F^2(t-N)$. Similarly, the spatiotemporal tensor for scaling factor "K" may be constructed based on a spatiotemporal concatenation of $F^K(t-1)$, . . . , and $F^K(t-N)$. Thus, (K–1) spatiotemporal tensors may be constructed for scaling factors 2, 3, . . . , and K. Each spatiotemporal tensor (of the (K–1) spatiotemporal tensors) for a certain scaling factor may represent features of all reference 3D point cloud frames that may be down sampled by the scaling factor.

The first neural network predictor 112 may further receive (target) coordinate information (i.e., C(t)) associated with 3D points of the current 3D point cloud frame (i.e., P(t)). C(t) may indicate coordinates in the current 3D point cloud frame that may include 3D points whose features may be required to be predicted (or encoded) based on the feature set associated with the 3D points (whose coordinates of the 3D points may be included in the reference coordinate information) of each reference 3D point cloud frame. The 3D points of each reference 3D point cloud frame, whose coordinates may be associated with the reference coordinate information, may correspond to the 3D points of the current 3D point cloud frame whose coordinates may be included in C(t). In some embodiments, the spatiotemporal tensor for each scaling factor may be constructed based on the feature sets associated with all reference 3D point cloud frames that are down sampled by the corresponding scaling factor and a current feature set associated with the 3D points of the current 3D point cloud frame. The coordinates of the 3D points may be included in C(t) and the features of the current feature set associated with the 3D points may be padded with "1" for all scaling factors (since the features of the current feature set are to be predicted).

After the construction of the spatiotemporal tensors, a spatiotemporal analysis may be performed on each of the (K−1) spatiotemporal tensors. In accordance with an embodiment, the spatiotemporal analysis may include execution of a sparse convolution operation or a self-attention operation on each of the spatiotemporal tensors (i.e., the (K−1) spatiotemporal tensors). The sparse convolution operation on a spatiotemporal tensor may be performed based on a filter. The filter may weigh features represented by the spatiotemporal tensor in different spatial regions with the same weight value. The sparse convolution operation may modify each feature based on the corresponding feature, a set of neighboring features of the corresponding feature, and the weight value used to weigh the corresponding feature and each of the neighboring features. The count of neighboring features may be based on a size of the filter. The modification of each feature may result in the generation of a modified spatiotemporal tensor. Thus, the sparse operations on the (K−1) spatiotemporal tensors may result in the generation of (K−1) modified spatiotemporal tensors. Similarly, the self-attention operation on a spatiotemporal tensor (of the (K−1) spatiotemporal tensors) may modify features represented by the spatiotemporal tensor. The modification may be based on a filter of a predefined size that may weigh the features represented by the spatiotemporal tensor. The filter may modify each feature based on the corresponding feature, a weight of the corresponding feature, neighboring features of the corresponding feature, and weights of each of the neighboring features. The modification of the features may result in the generation of a modified spatiotemporal tensor. Thus, (K−1) modified spatiotemporal tensors may be generated based on the application of the self-attention network on the (K−1) spatiotemporal tensors.

The features represented by each modified spatiotemporal tensor (generated based on sparse convolution or self-attention) may be down sampled by a certain scaling factor. The scaling factor by which a modified spatiotemporal tensor may have to be down sampled can be based on the scaling factor (such as 2, 3, . . . , or K) for which the original version of the modified spatiotemporal tensor may be constructed and the highest scaling factor (i.e., K) by which the feature set of each reference 3D point cloud frame of the set of reference 3D point cloud frames is down sampled. Thereafter, an inception residual network may be applied on each down sampled modified spatiotemporal tensor for a generation of a final spatiotemporal tensor. Thus, (K−1) final spatiotemporal tensors may be generated as outputs of the inception residual network.

The (K−1) final spatiotemporal tensors may be concatenated to generate a multi-scale feature concatenation vector. A sparse convolution operation or a self-attention operation may be performed on the multi-scale feature concatenation vector. The first neural network predictor 112 may predict a second set of features (i.e., F˜(t)) associated with the 3D points (whose coordinates are included in C(t)) of the current 3D point cloud frame (i.e., P(t)), based on outcome of the sparse convolution operation or the self-attention operation. Thus, the second set of features may be predicted further based on coordinate information (i.e., C(t)) associated with the 3D points of the current 3D point cloud frame.

The subtractor 402 may receive the first set of features (i.e., F(t)) and the second set of features (i.e., F˜(t)) as inputs. A set of residual features (i.e., R(t)) may be computed based on the first set of features and the second set of features. The set of residual features may indicate a difference between an actual set of features (i.e., F(t) generated by the first PCC encoder 110) and the predicted set of features (i.e., F˜(t)) generated by the first neural network predictor 112). The difference may be used for compensating any error that may result in the prediction of features associated with the current 3D point cloud frame (i.e., P(t)). The predicted features may be used for the reconstruction of the current 3D point cloud frame (i.e., 3D points of P(t) whose coordinates are included in C(t)).

The quantizer 404 may receive the set of residual features (i.e., R(t)) and may quantize each residual feature of the set of residual features to a quantization level of a set of predefined quantization levels. The quantizer 404 may generate, as an output, a set of quantized residual features based on application of a quantization scheme on the set of residual features. The quantization scheme may be based on an entropy model. The auto-encoder 406 may receive the set of quantized residual features as an input and may generate a bitstream of encoded point cloud data for the current 3D point cloud frame as an output. The generation may be based on application of an encoding scheme on the set of quantized residual features. The encoding scheme may be based on an entropy model and may compress each quantized residual feature of the set of quantized residual features to encode the set of quantized residual features.

In accordance with an embodiment, the octree-based encoder 114 may receive the coordinate information (i.e., C(t)) as an input and may encode the coordinate information to generate encoded coordinate information. The circuitry 202 may include the encoded coordinate information in the generated bitstream of encoded point cloud data and may transmit the generated bitstream to the second electronic device 104.

The circuitry 302 may receive the generated bitstream and may extract the encoded coordinate information and the encoded point cloud data from the bitstream. The octree-based decoder 118 may receive the encoded coordinate information as an input and may decode the encoded coordinate information to regenerate the coordinate information (i.e., C(t)). The coordinate information may be associated with the 3D points of the current 3D point cloud frame (i.e., P(t)) to be decoded. Based on the regenerated coordinate information, the target coordinates in the current 3D point cloud frame that include the 3D points to be decoded may be determined.

The auto-decoder 408 may receive the encoded point cloud data as an input and may regenerate the set of residual features (i.e., R˜(t)) as an output. The regeneration may be based on application of a decoding scheme on the encoded point cloud data. The decoding scheme may be based on the entropy model and may decompress the set of quantized residual features. The set of residual features (i.e., R˜(t))

may be used to reconstruct the 3D points (whose coordinates are included in C(t)) of the current 3D point cloud frame (i.e., P(t)).

The second PCC encoder 116 may receive, as an input, a 3D point cloud sequence that may include the set of reference 3D point cloud frames i.e., P(t−1), P(t−2), . . . , and P(t−N). Based on the inputs, reference frame data comprising a feature set associated with 3D points of each reference 3D point cloud frame of the set of reference 3D point cloud frames may be generated as an output. The reference frame data may be generated based on application of the second PCC encoder 116 on the set of reference 3D point cloud frames. For example, a feature set associated with the 3D points of the reference 3D point cloud frame P(t−1) may be F(t−1). Similarly, a feature set associated with the 3D points of the reference 3D point cloud frame P(t−N) may be F(t−N). The feature set associated with 3D points of each reference 3D point cloud frame of the set of reference 3D point cloud frames may include reference features associated with occupancy of the 3D points in a corresponding reference 3D point cloud frame of the set of reference 3D point cloud frames and reference coordinate information associated with the 3D points of the corresponding reference 3D point cloud frame. The 3D points may correspond to the 3D points of the current 3D point cloud frame (i.e., P(t)) whose coordinates may be included in the regenerated coordinate information (i.e., C(t)).

The second neural network predictor 120 may receive the feature set associated with 3D points of each reference 3D point cloud frame of the set of reference 3D point cloud frames as an input. Thereafter, the second neural network predictor 120 may predict, as an output, a third set of features (i.e., F'(t)) associated with 3D points of the current 3D point cloud frame (i.e., P(t)). The 3D points of P(t) may be required to be decoded and the coordinates of the 3D points may be included in C(t). The prediction may be based on application of the second neural network predictor 120 on the reference frame data, i.e., the feature set associated with 3D points of each reference 3D point cloud frame. The third set of features may be predicted further based on the (re)generated coordinate information (i.e., C(t)). The generation of the third set of features may be identical to the generation of the second set of features by the first neural network predictor 112.

The accumulator 410 may receive the third set of features (i.e., F'(t)) and the regenerated set of residual features (i.e., R˜(t)) as inputs. The accumulator 410 may generate, as an output, a fourth set of features (i.e., F″(t)) associated with the 3D points (i.e., whose coordinates may be included in C(t)) of the current 3D point cloud frame (i.e., P(t)). The generation may be based on an accumulation of the third set of features and the regenerated set of residual features. The PCC decoder 122 may receive the fourth set of features as an input and may reconstruct the current 3D point cloud frame (i.e., P(t)) based on application of a decoding scheme on the fourth set of features. The PCC decoder 122 may generate a 3D point cloud frame (i.e., P'(t)) as an output (which may correspond to P(t)).

Figure 5:
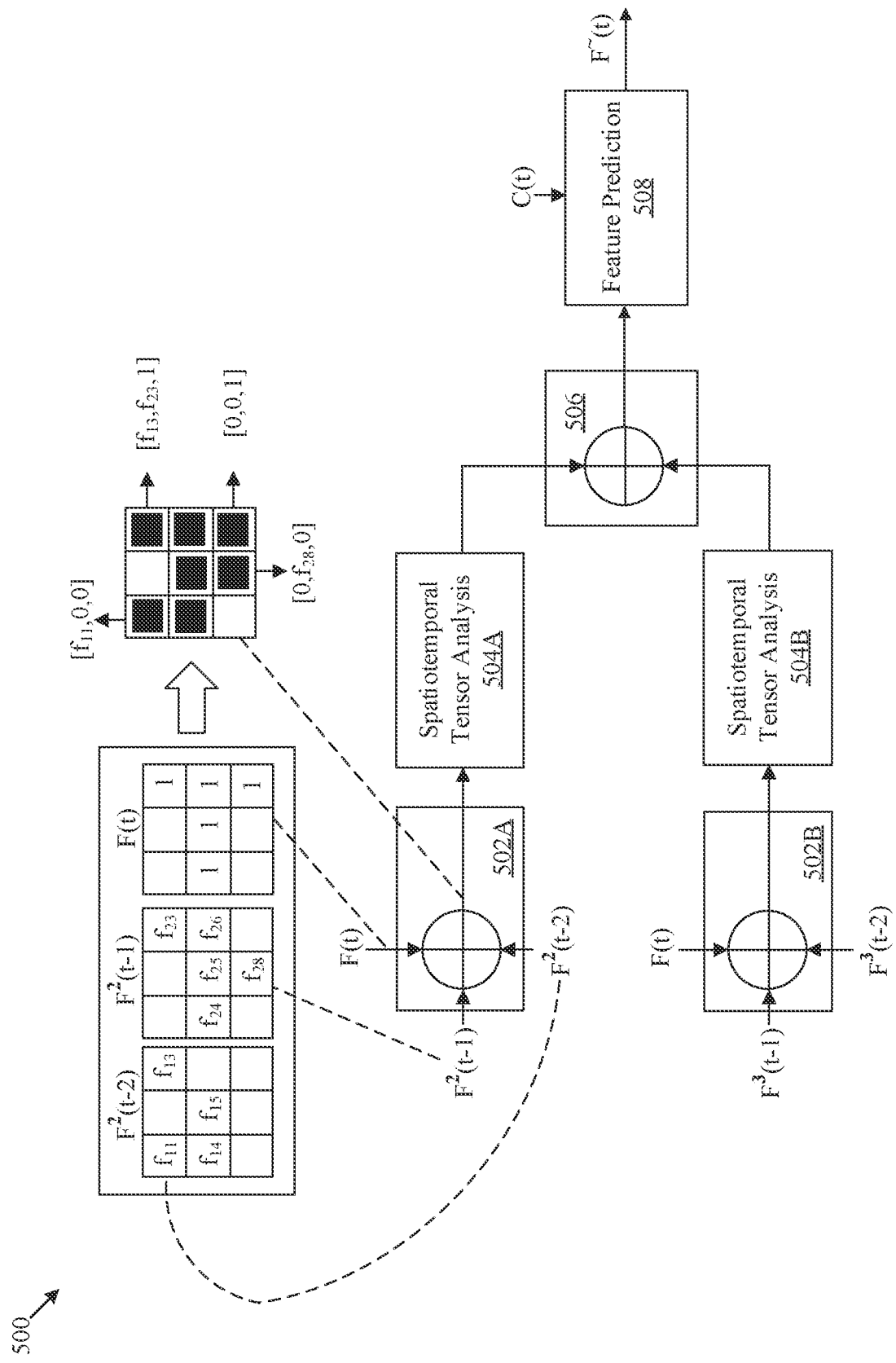
FIG. 5 is a block diagram that illustrates exemplary operations for a prediction of a set of features associated with a current 3D point cloud frame based on multi-scale features associated with a set of reference 3D point cloud frames, in accordance with an embodiment of the disclosure.

FIG. 5 is a block diagram that illustrates exemplary operations for prediction of a set of features associated with a current 3D point cloud frame based on multi-scale features associated with a set of reference 3D point cloud frames, in accordance with an embodiment of the disclosure. FIG. 5 is explained in conjunction with elements from FIG. 1, FIG. 2, FIG. 3, and FIG. 4. With reference to FIG. 5, there is shown an exemplary block diagram 500 for a prediction of a set of features associated with a current 3D point cloud frame. The exemplary block diagram 500 may include a sequence of blocks that may be representative of a sequence of operations that may start from 502 and end at 508. The sequence of operations may be executed by the first neural network predictor 112 or the second neural network predictor 120. The first neural network predictor 112 or the second neural network predictor 120 may receive two feature sets, viz., F(t−1) and F(t−2) as inputs. F(t−1) may be associated with 3D points of a reference 3D point cloud frame P(t−1). F(t−2) may be associated with 3D points of a reference 3D point cloud frame P(t−2). Both P(t−2) and P(t−1) may precede a current 3D point cloud frame P(t). P(t) is to be encoded or decoded based on prediction of features associated with 3D points of P(t).

F(t−1) may include reference features associated with an occupancy of 3D points in P(t−1) and reference coordinate information associated with the 3D points of P(t−1). For example, F(t−1) may include reference features $f_{11}$, $f_{13}$, $f_{14}$, and $f_{15}$ associated with four 3D points of P(t−1) and reference coordinates of the four 3D points. On the other hand, F(t−2) may include reference features associated with an occupancy of 3D points in P(t−2) and reference coordinate information associated with the 3D points of P(t−2). For example, F(t−2) may include reference features $f_{23}$, $f_{24}$, $f_{25}$, $f_{26}$, and $f_{28}$ associated with five 3D points of P(t−2) and reference coordinates of the five 3D points.

A feature set associated with 3D points of P(t) may be constructed based on (target) coordinate information C(t). C(t) may include coordinates of the 3D points of P(t). The first neural network predictor 112 or the second neural network predictor 120 may receive C(t) as an input. For example, the C(t) may include coordinates of five 3D points. The coordinates may be $c_{33}$, $c_{34}$, $c_{35}$, $c_{36}$, and $c_{39}$. The feature set may include features associated with the five 3D points of P(t). In accordance with an embodiment, the feature set may be constructed by padding features associated with the five 3D points with "1". The constructed feature set may be represented as F(t), i.e., [$1_{33}$, $1_{34}$, $1_{35}$, $1_{36}$, $1_{39}$]). The first neural network predictor 112 or the second neural network predictor 120 may predict a feature set (i.e., F˜(t)) (for example, [$f_{33}$, $f_{34}$, $f_{35}$, $f_{36}$, $f_{39}$]) associated with the five 3D points of P(t) (whose coordinates may be included in C(t)) based on down sampling of each of F(t−2), F(t−1), and F(t) by scaling factors of "2" and "3" for encoding or decoding of P(t).

The reference features in F(t−2) (i.e., $f_{11}$, $f_{13}$, $f_{14}$, and $f_{15}$) may be down sampled by scaling factors of "2" and "3" for generation of $F^2$(t−2) and $F^3$(t−2) respectively. Similarly, the reference features in F(t−1) (i.e., $f_{23}$, $f_{24}$, $f_{25}$, $f_{26}$, and $f_{28}$) may be down sampled by scaling factors of "2" and "3" for generation of $F^2$(t−1) and $F^3$(t−1) respectively. Since F(t) is constructed by padding "1" to the features of 3D points of P(t), down sampling of F(t) by scaling factors of "2" and "3" may return F(t).

At 502A, F(t), $F^2$(t−1), and $F^2$(t−2) may be spatiotemporally concatenated. The spatiotemporal concatenation may result in generation of a first spatiotemporal tensor. The first spatiotemporal tensor may be constructed for a scaling factor "2" and may be generated based on features of all reference 3D point cloud frames (i.e., P(t−2) and P(t−1)) that have been down sampled by a scaling factor "2". For example, features represented by the first spatiotemporal tensor may include feature vectors such as [f11, 0, 0], [0, 0, 0], [f13, f23, 1], [f14, f24, 1], [f15, f25, 1], [0, f26, 1], [0, 0, 0], [0, f28, 0], and [0, 0, 1]. Herein, [0,0,0] indicates an empty region.

At 502B, F(t), $F^3(t-1)$, and $F^3(t-2)$ may be spatiotemporally concatenated. The spatiotemporal concatenation may result in a generation of a second spatiotemporal tensor. The second spatiotemporal tensor may be constructed for a scaling factor "3" and may be generated based on features of all reference 3D point cloud frames (i.e., P(t−2) and P(t−1)) that have been down sampled by a scaling factor "3".

At 504A, a spatiotemporal analysis may be performed on the first spatiotemporal tensor. The spatiotemporal analysis may be based on a self-attention operation and may result in a modification of features represented by the first spatiotemporal tensor. The modification of each feature may be based on one or more of a size of a filter used to perform the self-attention operation, a weight assigned to the corresponding feature, and weights assigned to each neighboring feature of the corresponding feature. Based on the modification of each feature represented by the first spatiotemporal tensor, a modified first spatiotemporal tensor may be generated.

At 504B, a spatiotemporal analysis may be performed on the second spatiotemporal tensor. The spatiotemporal analysis may be based on a self-attention operation, which may result in modification of each feature represented by the second spatiotemporal tensor. Based on modification of each feature, a modified second spatiotemporal tensor may be generated.

At 506, a multi-scale feature concatenation vector may be generated based on spatiotemporal concatenation of the modified first spatiotemporal tensor and the modified second spatiotemporal tensor.

At 508, features associated with the 3D points of the current 3D point cloud frame (i.e., P(t)) may be predicted. The prediction may be based on application of a sparse convolution operation or a self-attention operation on the generated multi-scale feature concatenation vector. The coordinates of the 3D points of the current 3D point cloud frame (whose features are predicted) may be included in C(t). Thus, the prediction may be further based on the coordinate information (i.e., C(t)). The predicted features may include $f_{33}$, $f_{34}$, $f_{35}$, $f_{36}$, and $f_{39}$. Based on such predicted features, the 3D points (i.e., $c_{33}$, $c_{34}$, $c_{35}$, $c_{36}$, and $c_{39}$) may be encoded or decoded.

Figure 6:
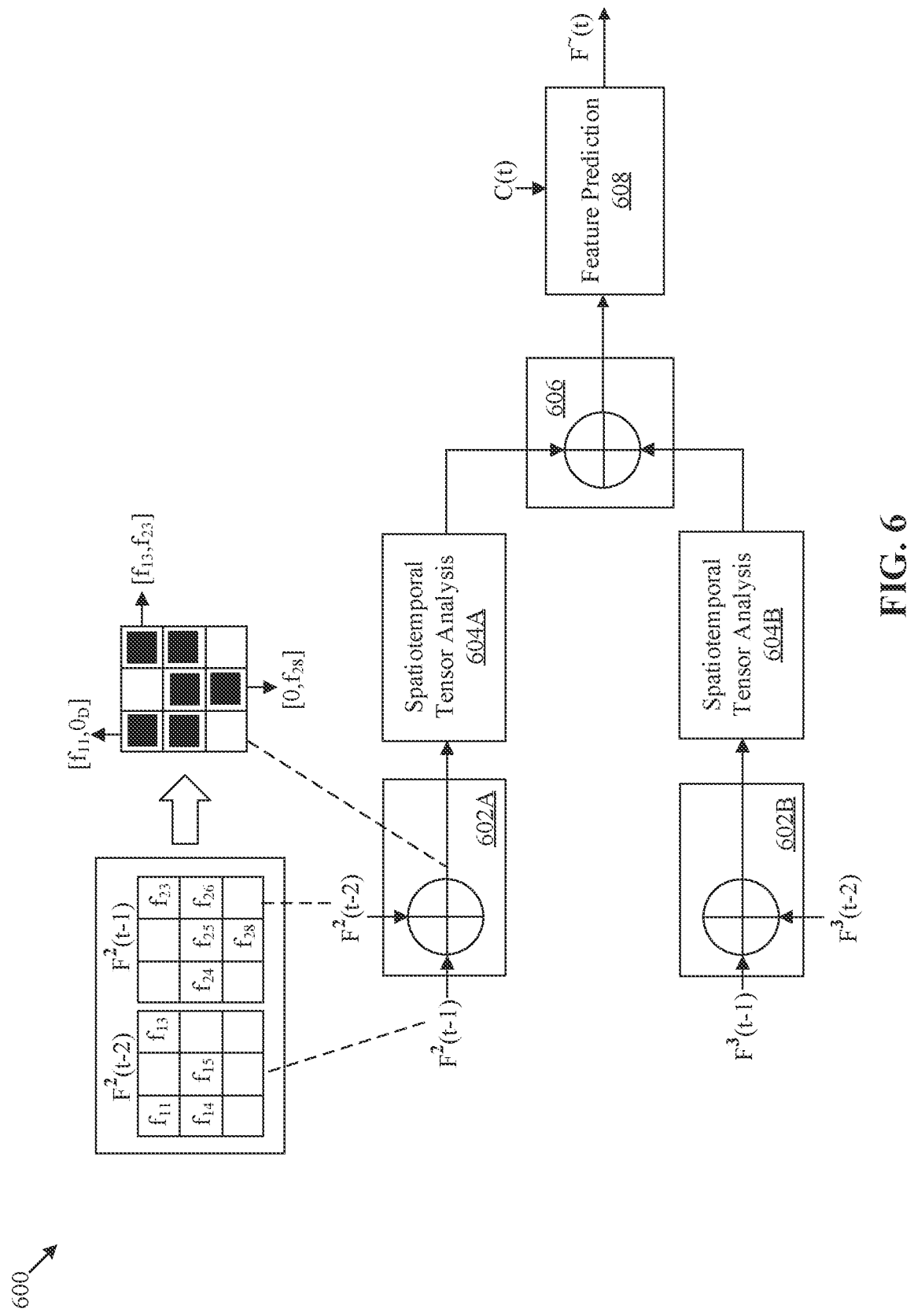
FIG. 6 is a block diagram that illustrates exemplary operations for a prediction of a set of features associated with a current 3D point cloud frame based on multi-scale features associated with a set of reference 3D point cloud frames, in accordance with an embodiment of the disclosure.

FIG. 6 is a block diagram that illustrates exemplary operations for a prediction of a set of features associated with a current 3D point cloud frame based on multi-scale features associated with a set of reference 3D point cloud frames, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary block diagram 600 for a prediction of a set of features associated with the current 3D point cloud frame (i.e., P(t)). The block diagram 600 may include a sequence of blocks that may be representative of a sequence of operations that may start from 602 and end at 608. The sequence of operations may be executed by the first neural network predictor 112 or the second neural network predictor 120. The first neural network predictor 112 or the second neural network predictor 120 may receive two feature sets, viz., F(t−1) and F(t−2) as inputs. The first neural network predictor 112 or the second neural network predictor 120 may predict a feature set (i.e., F~(t)) associated with the 3D of P(t), whose coordinates may be included in C(t), based on down sampling of each of F(t−2) and F(t−1) by scaling factors of "2" and "3". F~(t) may be predicted for encoding or decoding of P(t).

At 602A, $F^2(t-1)$ and $F^2(t-2)$ may be spatiotemporally concatenated. The spatiotemporal concatenation may result in the generation of a first spatiotemporal tensor. The first spatiotemporal tensor may be constructed for a scaling factor "2" and may be generated based on features of all reference 3D point cloud frames (i.e., P(t−2) and P(t−1)) that have been down sampled by the scaling factor "2". For example, features represented by the first spatiotemporal tensor may include feature vectors such as $[f_{11},0]$, $[0,0]$, $[f_{13}, f_{23}]$, $[f_{14}, f_{24}]$, $[f_{15}, f_{25}]$, $[0, f_{26}]$, $[0,0]$, $[0, f_{28}]$, and $[0, 0]$. Herein, [0,0] indicates an empty region.

At 602B, $F^3(t-1)$, and $F^3(t-2)$ may be spatiotemporally concatenated. The spatiotemporal concatenation may result in the generation of a second spatiotemporal tensor. The second spatiotemporal tensor may be constructed for a scaling factor "3", and, hence, may be generated based on features of all reference 3D point cloud frames (i.e., P(t−2) and P(t−1)) that have been down sampled by the scaling factor "3".

At 604A, a spatiotemporal analysis may be performed on the first spatiotemporal tensor. In an embodiment, the spatiotemporal analysis may be based on sparse convolution operation and may result in a modification of each of the features represented by the first spatiotemporal tensor. The modification of each feature may be based on one or more of a size of a filter used to perform the sparse convolution operation, and a weight assigned to each of the corresponding feature and the neighboring features of the corresponding feature. Based on the modification of each feature represented by the first spatiotemporal tensor, a modified first spatiotemporal tensor may be generated. Thereafter, the modified first spatiotemporal tensor may be down sampled to generate a down sampled modified first spatiotemporal tensor. The down sampled first spatiotemporal tensor may be passed as an input to a first inception residual network, which may generate a final spatiotemporal tensor as output.

At 604B, a spatiotemporal analysis may be performed on the second spatiotemporal tensor. The spatiotemporal analysis may be based on a sparse convolution operation and may result in a modification of each feature represented by the second spatiotemporal tensor. Based on the modification of each feature, a modified second spatiotemporal tensor may be generated. The modified second spatiotemporal tensor may be passed as an input to a first inception residual network, which may generate a final spatiotemporal tensor as output.

At 606, a multi-scale feature concatenation vector may be generated based on spatiotemporal concatenation of the final spatiotemporal tensor generated by the first inception residual network and the final spatiotemporal tensor generated by the second inception residual network.

At 608, features associated with the 3D points of the current 3D point cloud frame (i.e., P(t)) may be predicted. The prediction may be based on application of a sparse convolution operation or a self-attention operation on the generated multi-scale feature concatenation vector. The coordinates of the 3D points of the current 3D point cloud frame (whose features are predicted) may be included in C(t). Thus, the prediction may be further based on the coordinate information (i.e., C(t)). Based on the predicted features, the 3D points of P(t) may be encoded or decoded.

Figure 7A:
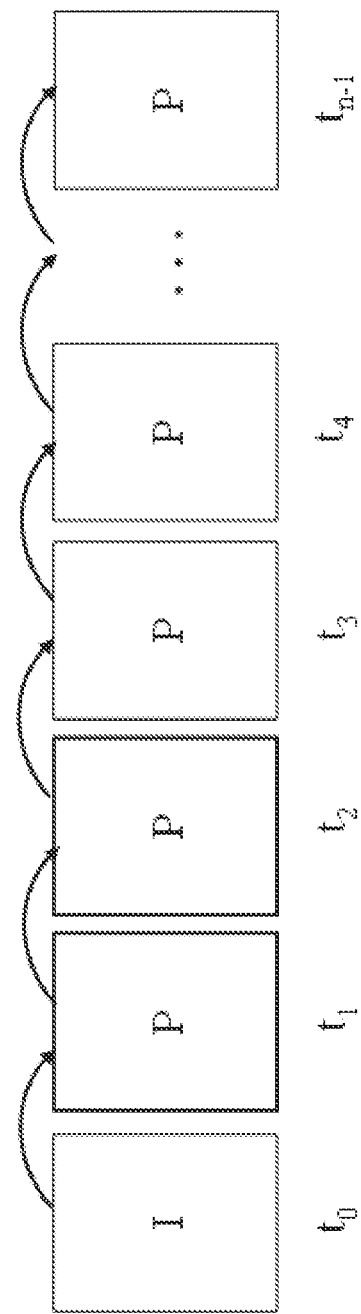
FIG. 7A is a diagram that illustrates an exemplary scenario for an encoding or decoding 3D point cloud frames based on preceding 3D point cloud frames, in accordance with an embodiment of the disclosure.

FIG. 7A is a diagram that illustrates an exemplary scenario for an encoding or decoding 3D point cloud frames based on preceding 3D point cloud frames, in accordance with an embodiment of the disclosure. FIG. 7A is explained in conjunction with elements from FIG. 1, FIG. 2, FIG. 3, FIG. 4, FIG. 5, and FIG. 6. With reference to FIG. 7A, there is shown an exemplary scenario 700A. In the exemplary scenario 700A there is shown an exemplary sequence of 3D point cloud frames that may include an "I" 3D point cloud frame and a set of "P" 3D point cloud frames. The "I" 3D point cloud frame may be encoded/decoded independently, whereas each "P" 3D point cloud frame may be encoded/decoded based on a previous 3D point cloud frame. For example, at time-instant to, the "I" 3D point cloud frame may be encoded/decoded. At time-instant $t_1$, a "P" 3D point cloud frame of the set of "P" 3D point cloud frames may be encoded/decoded based on predicted features associated with occupancy of 3D points of the "I" 3D point cloud frame. At time-instant $t_2$, another "P" 3D point cloud frame of the set of "P" 3D point cloud frames may be encoded/decoded based on predicted features associated with occupancy of 3D points of the "P" 3D point cloud frame that is encoded/decoded at the time-instant $t_1$. Similarly, other "P" 3D point cloud frames of the set of "P" 3D point cloud frames may be encoded/decoded.

Figure 7B:
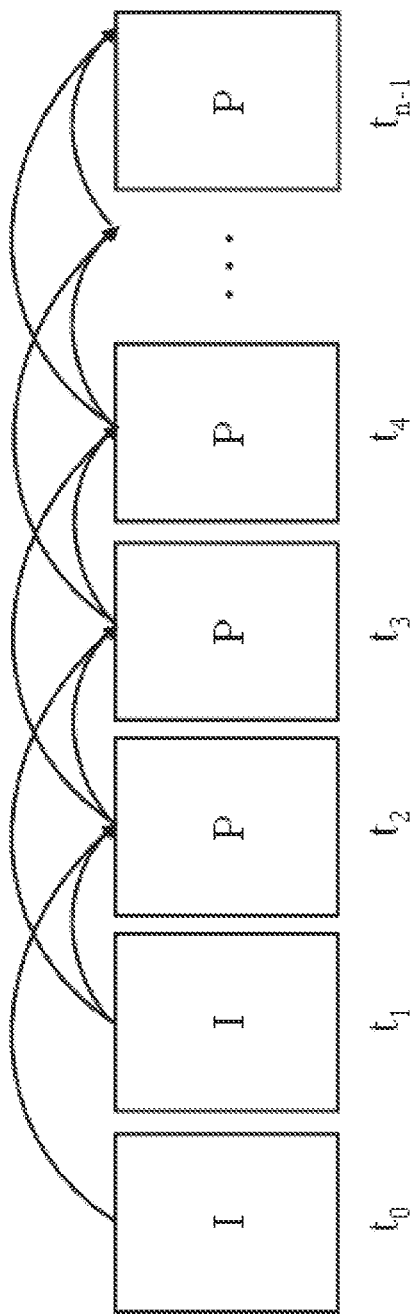
FIG. 7B is a diagram that illustrates an exemplary scenario for an encoding or decoding 3D point cloud frames based on two preceding 3D point cloud frames, in accordance with an embodiment of the disclosure.

FIG. 7B is a diagram that illustrates an exemplary scenario for an encoding or decoding 3D point cloud frames based on two preceding 3D point cloud frames, in accordance with an embodiment of the disclosure. FIG. 7B is explained in conjunction with elements from FIG. 1, FIG. 2, FIG. 3, FIG. 4, FIG. 5, FIG. 6, and FIG. 7A. With reference to FIG. 7B, there is shown an exemplary scenario 700B. In the exemplary scenario 700B there is shown an exemplary sequence of 3D point cloud frames that may include two "I" 3D point cloud frames and a set of "P" 3D point cloud frames. The "I" 3D point cloud frames may be encoded/decoded independently, whereas each "P" 3D point cloud frame may be encoded/decoded based on two previous 3D point cloud frames.

For example, at time-instant to, a first "I" 3D point cloud frame may be encoded or decoded and at time-instant $t_1$, a second "I" 3D point cloud frame may be encoded or decoded. At time-instant $t_2$, a "P" 3D point cloud frame of the set of "P" 3D point cloud frames may be encoded/decoded based on predicted features associated with occupancy of 3D points of the first "I" 3D point cloud frame and predicted features associated with occupancy of 3D points of the second "I" 3D point cloud frame. At time-instant $t_3$, another "P" 3D point cloud frame of the set of "P" 3D point cloud frames may be encoded/decoded based on predicted features associated with occupancy of 3D points of the second "I" 3D point cloud frame (encoded/decoded at time-instant $t_1$) and predicted features associated with occupancy of 3D points of the "P" 3D point cloud frame that was encoded/decoded at time-instant $t_2$. At time-instant ta, another "P" 3D point cloud frame of the set of "P" 3D point cloud frames may be encoded/decoded based on predicted features associated with occupancy of 3D points of the "P" 3D point cloud frame that was encoded/decoded at time-instant $t_2$ and predicted features associated with occupancy of 3D points of the "P" 3D point cloud frame that was encoded/decoded at time-instant $t_2$. Similarly, other "P" 3D point cloud frames of the set of "P" 3D point cloud frames may be encoded/decoded.

Figure 8:
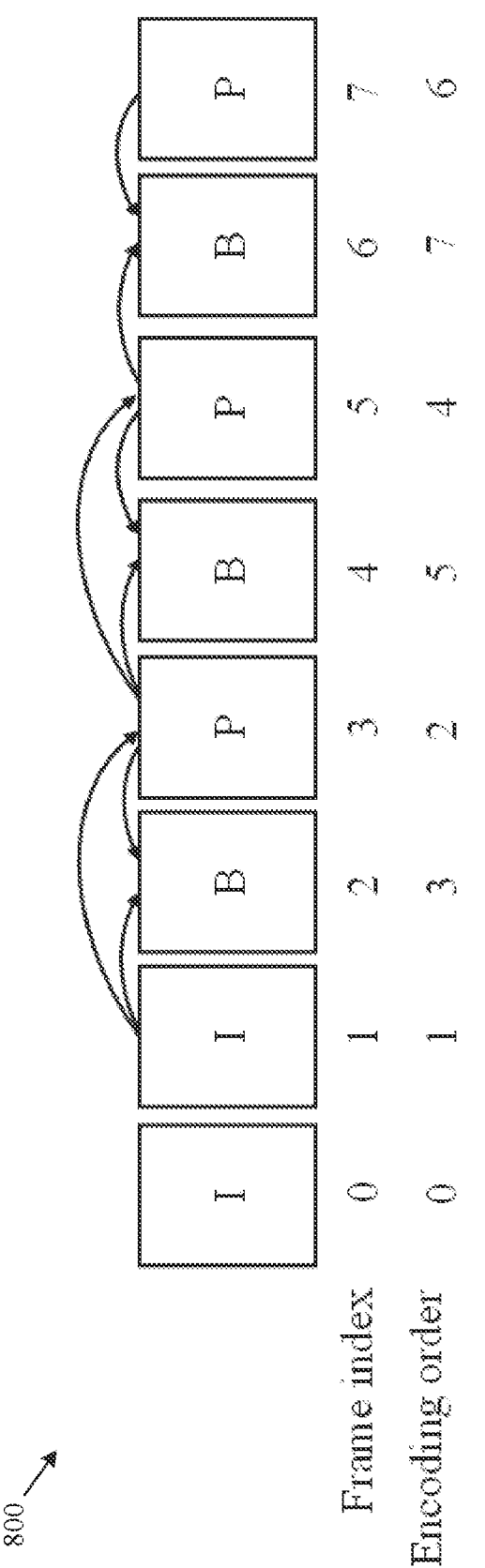
FIG. 8 is a diagram that illustrates an exemplary scenario for encoding/decoding 3D point cloud frames based on a preceding 3D point cloud frame and a succeeding 3D point cloud frame, in accordance with an embodiment of the disclosure.

FIG. 8 is a diagram that illustrates an exemplary scenario for encoding/decoding 3D point cloud frames based on a preceding 3D point cloud frame and a succeeding 3D point cloud frame, in accordance with an embodiment of the disclosure FIG. 8 is explained in conjunction with elements from FIG. 1, FIG. 2, FIG. 3, FIG. 4, FIG. 5, FIG. 6, FIG. 7A, and FIG. 7B. With reference to FIG. 8, there is shown an exemplary scenario 800. In the exemplary scenario 800 there is shown an exemplary sequence of 3D point cloud frames that may include two "I" 3D point cloud frames, three "P" 3D point cloud frames, and three "B" 3D point cloud frames.

The "I" 3D point cloud frames may be encoded/decoded independently. Each "P" 3D point cloud frames may be encoded/decoded based on a previous 3D point cloud frame such as an "I" 3D point cloud frame or a P'" 3D point cloud frame. Each "B" 3D point cloud frames may be encoded/decoded based on a previous 3D point cloud frame (such as an I'' 3D point cloud frame or a P'' 3D point cloud frame) and a succeeding 3D point cloud frame (such as a P'" 3D point cloud frame).

For example, at time-instant to, a first "I" 3D point cloud frame (i.e., first frame with frame index-0) may be encoded/decoded and at time-instant $t_1$, a second "I" 3D point cloud frame (i.e., second frame with frame index-1) may be encoded/decoded. At time-instant $t_2$, a first "P" 3D point cloud frame (i.e., fourth frame with frame index-3) may be encoded or decoded based on predicted features associated with occupancy of 3D points of the second "I" 3D point cloud frame. The encoding/decoding order of the first "P" 3D point cloud frame may be "2", since the first "P" 3D point cloud frame is the third frame that is encoded/decoded (after the encoding/decoding of the first "I" 3D point cloud frame and the second "I" 3D point cloud frame). At time-instant $t_3$, a first "B" 3D point cloud frame (i.e., third frame with frame index-2) may be encoded or decoded based on predicted features associated with occupancy of 3D points of the second "I" 3D point cloud frame (i.e., preceding frame) and predicted features associated with occupancy of 3D points of the first "P" 3D point cloud frame (i.e., succeeding frame). The encoding/decoding order of the first "B" 3D point cloud frame may be "3" (i.e., the fourth frame to be encoded or decoded). At time-instant ta, a second "P" 3D point cloud frame (i.e., sixth frame with frame index-5) may be encoded/decoded based on predicted features associated with occupancy of 3D points of the first "P" 3D point cloud frame. The encoding/decoding order of the second "P" 3D point cloud frame may be "4" (i.e., the fifth frame to be encoded or decoded). At time-instant $t_5$, a second "B" 3D point cloud frame (i.e., fifth frame with frame index-4) may be encoded or decoded based on predicted features associated with occupancy of 3D points of the first "P" 3D point cloud frame (i.e., preceding frame) and predicted features associated with occupancy of 3D points of the second "P" 3D point cloud frame (i.e., succeeding frame). The encoding/decoding order of the second "B" 3D point cloud frame may be "5" (i.e., the sixth frame to be encoded or decoded). Similarly, a third "P" 3D point cloud frame (i.e., eighth frame with frame index-7) and a third "B" 3D point cloud frame (i.e., seventh frame with frame index-6) may be encoded/decoded.

Figure 9:
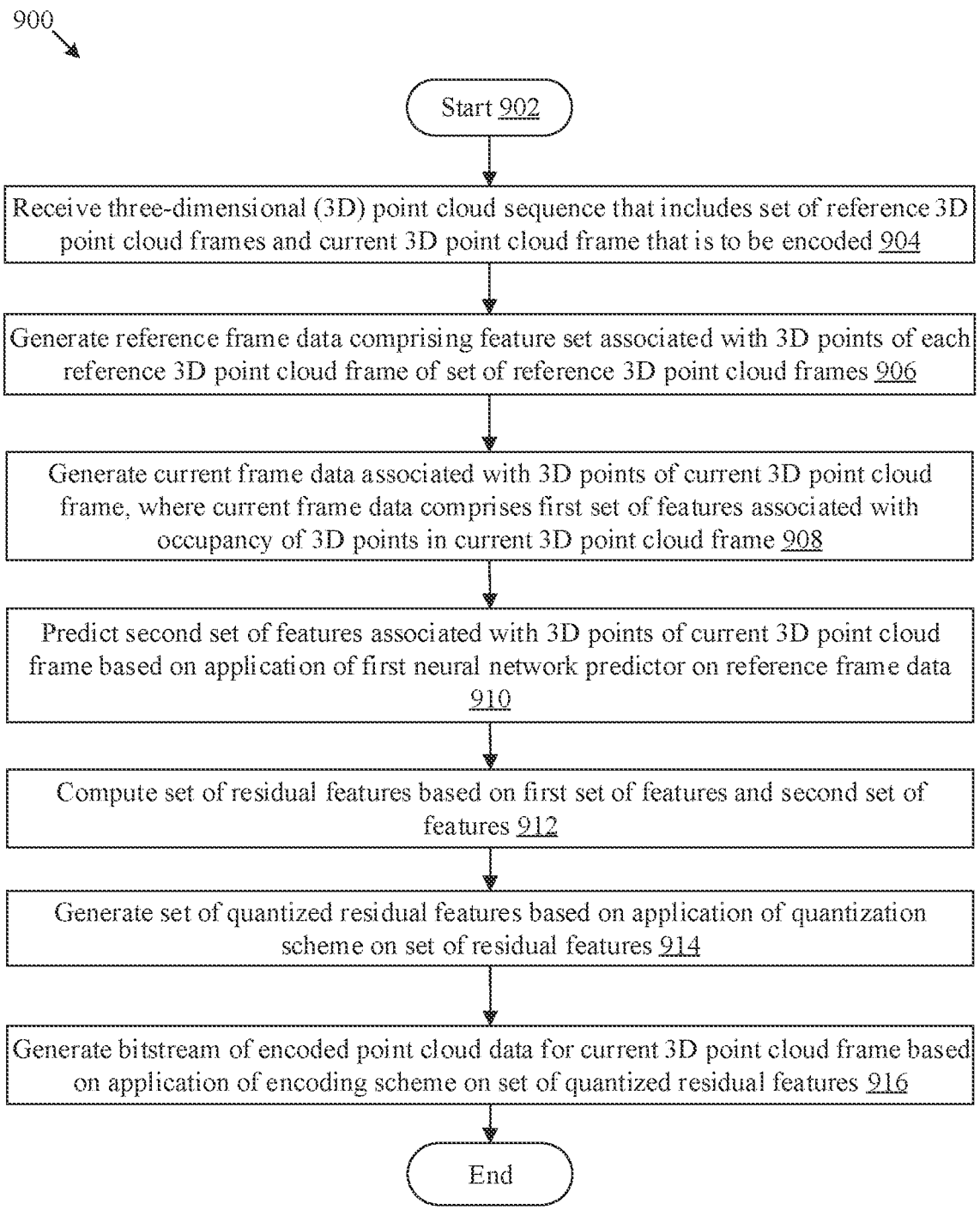
FIG. 9 is a flowchart that illustrates operations for an exemplary method for multiscale inter-prediction for dynamic 3D point cloud frame compression, in accordance with an embodiment of the disclosure.

FIG. 9 is a flowchart that illustrates operations for an exemplary method for multiscale inter-prediction for dynamic 3D point cloud frame compression, in accordance with an embodiment of the disclosure. FIG. 9 is explained in conjunction with elements from FIGS. 1, 2, 3, 4, 5, 6, 7A, 7B, and 8. With reference to FIG. 9, there is shown a flowchart 900. The operations from 902 to 916 may be implemented by any computing system, such as, by the first electronic device 102, or the circuitry 202 of the first electronic device 102. The operations may start at 902 and may proceed to 904.

At 904, a 3D point cloud sequence that may include a set of reference 3D point cloud frames and a current 3D point cloud frame that is to be encoded, may be received. In at least one embodiment, the circuitry 202 may be configured to receive the 3D point cloud sequence that may include the set of reference 3D point cloud frames and the current 3D point cloud frame that is to be encoded. The details of reception of the set of reference 3D point cloud frames and a current 3D point cloud frame, is described, for example, in FIG. 1 and FIG. 4.

At 906, reference frame data comprising a feature set associated with 3D points of each reference 3D point cloud frame of the set of reference 3D point cloud frames may be generated. In at least one embodiment, the circuitry 202 may be configured to generate the reference frame data comprising the feature set associated with the 3D points of each reference 3D point cloud frame of the set of reference 3D point cloud frames. The details of generation of the reference frame data is described, for example, in FIG. 1 and FIG. 4.

At 908, current frame data associated with 3D points of the current 3D point cloud frame may be generated. In at least one embodiment, the circuitry 202 may be configured to generate the current frame data associated with the 3D points of the current 3D point cloud frame. The current frame data may include a first set of features associated with an occupancy of the 3D points in the current 3D point cloud frame. The details of generation of the current frame data, is described, for example, in FIG. 1 and FIG. 4.

At 910, a second set of features associated with the 3D points of the current 3D point cloud frame may be predicted based on an application of the first neural network predictor on the reference frame data. In at least one embodiment, the circuitry 202 may be configured to predict the second set of features associated with the 3D points of the current 3D point cloud frame based on the application of the first neural network predictor on the reference frame data. The details of prediction of the second set of features, are described, for example, in FIG. 1, FIG. 4, FIG. 5, and FIG. 6.

At 912, a set of residual features may be computed based on the first set of features and the second set of features. In at least one embodiment, the circuitry 202 may be configured to compute the set of residual features based on the first set of features and the second set of features. The details of computation of the set of residual features, are described, for example, in FIG. 1 and FIG. 4.

At 914, a set of quantized residual features may be generated based on an application of a quantization scheme on the set of residual features. In at least one embodiment, the circuitry 202 may be configured to generate the set of quantized residual features based on the application of the quantization scheme on the set of residual features. The details of generation of the set of quantized residual features, are described, for example, FIG. 1 and FIG. 4.

At 916, a bitstream of encoded point cloud data may be generated for the current 3D point cloud frame based on application of an encoding scheme on the set of quantized residual features. In at least one embodiment, the circuitry 202 may be configured to generate the bitstream of encoded point cloud data for the current 3D point cloud frame based on application of the encoding scheme on the set of quantized residual features. The details of generation of the bitstream of encoded point cloud data, are described, for example, in FIG. 1 and FIG. 4. Control may pass to end.

Although the flowchart 900 is illustrated as discrete operations, such as 904, 906, 908, 910, 912, 914, and 916, the disclosure is not so limited. Accordingly, in certain embodiments, such discrete operations may be further divided into additional operations, combined into fewer operations, or eliminated, depending on the implementation without detracting from the essence of the disclosed embodiments.

Figure 10:
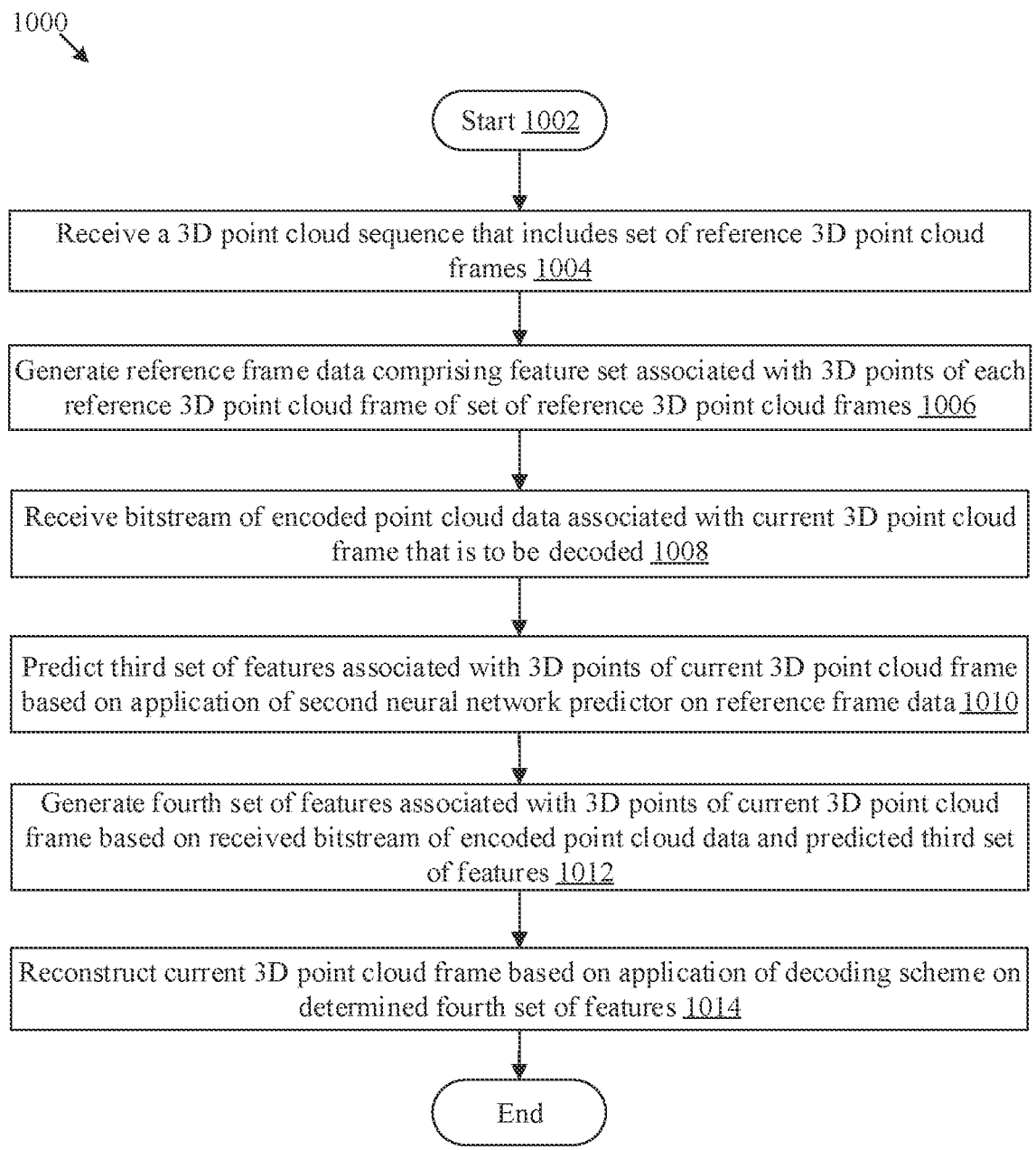
FIG. 10 is a flowchart that illustrates operations for an exemplary method for multiscale inter-prediction for 3D point cloud frame reconstruction, in accordance with an embodiment of the disclosure.

FIG. 10 is a flowchart that illustrates operations for an exemplary method for multiscale inter-prediction for 3D point cloud frame reconstruction, in accordance with an embodiment of the disclosure. FIG. 10 is explained in conjunction with elements from FIGS. 1, 2, 3, 4, 5, 6, 7A, 7B, 8, and 9. With reference to FIG. 10, there is shown a flowchart 1000. The operations from 1002 to 1014 may be implemented by any computing system, such as, by the second electronic device 104 or the circuitry 302 of the second electronic device 104. The operations may start at 1002 and may proceed to 1004.

At 1004, a 3D point cloud sequence that may include a set of reference 3D point cloud frames may be received. In at least one embodiment, the circuitry 302 may be configured to receive the 3D point cloud sequence that may include the set of reference 3D point cloud frames. The details of reception of the 3D point cloud sequence, is described, for example, in FIG. 1 and FIG. 4.

At 1006, reference frame data comprising a feature set associated with 3D points of each reference 3D point cloud frame of the set of reference 3D point cloud frames may be generated. In at least one embodiment, the circuitry 302 may be configured to generate the reference frame data comprising the feature set associated with 3D points of each reference 3D point cloud frame of the set of reference 3D point cloud frames. The details of generation of the reference frame data is described, for example, in FIG. 1 and FIG. 4.

At 1008, a bitstream of encoded point cloud data associated with a current 3D point cloud frame, that is to be decoded, may be received. In at least one embodiment, the circuitry 302 may be configured to receive the bitstream of encoded point cloud data associated with the current 3D point cloud frame that is to be decoded. The details of reception of the bitstream, is described, for example, in FIG. 1 and FIG. 4.

At 1010, a third set of features associated with 3D points of the current 3D point cloud frame may be predicted based on an application of the second neural network predictor on the reference frame data. In at least one embodiment, the circuitry 302 may be configured to predict the third set of features associated with 3D points of the current 3D point cloud frame based on the application of the second neural network predictor on the reference frame data. The details of prediction of the third set of features, are described, for example, in FIG. 1, FIG. 4, FIG. 5, and FIG. 6.

At 1012, a fourth set of features associated with the 3D points of the current 3D point cloud frame may be generated based on the received bitstream of encoded point cloud data and the predicted third set of features. In at least one embodiment, the circuitry 302 may be configured to generate the fourth set of features associated with the 3D points of the current 3D point cloud frame based on the received bitstream of encoded point cloud data and the predicted third set of features. The details of generation of the fourth set of features, are described, for example, FIG. 1 and FIG. 4.

At 1014, the current 3D point cloud frame may be reconstructed based on an application of a decoding scheme on the determined fourth set of features. In at least one embodiment, the circuitry 302 may be configured to reconstruct the current 3D point cloud frame based on the application of the decoding scheme on the determined fourth set of features. The details of reconstruction of the current 3D point cloud frame, are described, for example, in FIG. 1 and FIG. 4. Control may pass to end.

Although the flowchart 1000 is illustrated as discrete operations, such as 1004, 1006, 1008, 1010, 1012, and 1014, the disclosure is not so limited. Accordingly, in certain embodiments, such discrete operations may be further divided into additional operations, combined into fewer operations, or eliminated, depending on the implementation without detracting from the essence of the disclosed embodiments.

Exemplary aspects of the disclosure may include an electronic device (such as, the first electronic device 102 of FIG. 1) that may include circuitry (such as the circuitry 202 of FIG. 2), that may be communicatively coupled to another electronic device (such as the second electronic device 104 of FIG. 1). The first electronic device 102 may further include memory (such as the memory 204 of FIG. 2) that may be configured to store a predictor (such as the first neural network predictor 112 of FIG. 1). The memory 204 may be configured to store a PCC encoder (such as the first PCC encoder 110 of FIG. 1). The circuitry 202 may be configured to receive a 3D point cloud sequence that may include a set of reference 3D point cloud frames and a current 3D point cloud frame that is to be encoded. The set of reference 3D point cloud frames may include at least one reference 3D point cloud frame that may precede the current 3D point cloud frame or at least one reference 3D point cloud frame that may succeed the current 3D point cloud frame. The circuitry 202 may be further configured to generate reference frame data comprising a feature set associated with 3D points of each reference 3D point cloud frame of the set of reference 3D point cloud frames. The reference frame data may be generated based on an application of the first PCC encoder 110 on the set of reference 3D point cloud frames. The feature set associated with 3D points of each reference 3D point cloud frame of the set of reference 3D point cloud frames may include reference features associated with an occupancy of the 3D points in a corresponding reference 3D point cloud frame of the set of reference 3D point cloud frames and reference coordinate information associated with the 3D points of the corresponding reference 3D point cloud frame. The circuitry 202 may be further configured to generate current frame data associated with 3D points of the current 3D point cloud frame. The current frame data may be generated based on an application of the first PCC encoder 110 on the current 3D point cloud frame. The current frame data may include a first set of features associated with an occupancy of the 3D points in the current 3D point cloud frame. The circuitry 202 may be further configured to predict a second set of features associated with the 3D points of the current 3D point cloud frame based on application of the first neural network predictor 112 on the reference frame data. The second set of features may be predicted further based on coordinate information associated with the 3D points of the current 3D point cloud frame. The circuitry 202 may be further configured to compute a set of residual features based on the first set of features and the second set of features. The circuitry 202 may be further configured to generate a set of quantized residual features based on application of a quantization scheme on the set of residual features. The circuitry 202 may be further configured to generate a bitstream of encoded point cloud data for the current 3D point cloud frame based on application of an encoding scheme on the set of quantized residual features.

In accordance with an embodiment, the circuitry 202 may be further configured to encode the coordinate information based on an application of an octree-based encoder (such as the octree-based encoder 114) on the coordinate information. The bitstream of encoded point cloud data may include the encoded coordinate information.

In accordance with an embodiment, the circuitry 202 may be further configured to down sample the feature set associated with 3D points of each reference 3D point cloud frame of the set of reference 3D point cloud frames by at least one scaling factor.

Exemplary aspects of the disclosure may include an electronic device (such as, the second electronic device 104 of FIG. 1) that may include circuitry (such as the circuitry 302 of FIG. 3), that may be communicatively coupled to another electronic device (such as the first electronic device 102 of FIG. 1). The second electronic device 104 may further include memory (such as the memory 304 of FIG. 3) that may be configured to store a predictor (such as the second neural network predictor 120 of FIG. 1). The memory 204 may be configured to store a PCC encoder (such as the second PCC encoder 116 of FIG. 1) and a PCC decoder (such as the PCC decoder 122 of FIG. 1). The circuitry 302 may be configured to receive the 3D point cloud sequence that may include the set of reference 3D point cloud frames. The circuitry 302 may be further configured to generate reference frame data comprising a feature set associated with 3D points of each reference 3D point cloud frame of the set of reference 3D point cloud frames. The reference frame data may be generated based on an application of the second PCC encoder 116 on the set of reference 3D point cloud frames. The feature set associated with 3D points of each reference 3D point cloud frame of the set of reference 3D point cloud frames may include reference features associated with an occupancy of the 3D points in a corresponding reference 3D point cloud frame of the set of reference 3D point cloud frames and reference coordinate information associated with the 3D points of the corresponding reference 3D point cloud frame. The circuitry 302 may be further configured to receive a bitstream of encoded point cloud data associated with a current 3D point cloud frame that is to be decoded. The received bitstream of encoded point cloud data may further include encoded coordinate information associated with the 3D points of the current 3D point cloud frame. The circuitry 302 may be further configured to predict a third set of features associated with the 3D points of the current 3D point cloud frame based on an application of the second neural network predictor 120 on the reference frame data. The circuitry 302 may be further configured to generate a fourth set of features associated with the 3D points of the current 3D point cloud frame based on the received bitstream of encoded point cloud data and the predicted third set of features. The circuitry 302 may be further configured to reconstruct the current 3D point cloud frame based on application of a decoding scheme on the determined fourth set of features.

In accordance with an embodiment, the circuitry 302 may be further configured to generate coordinate information associated with the 3D points of the current 3D point cloud frame based on application of an octree-based decoder (such as the octree-based decoder 118) on the encoded coordinate information. The third set of features may be predicted further based on the generated coordinate information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A first electronic device, comprising:
 a memory configured to store a first neural network predictor; and
 circuitry configured to:
  receive a three-dimensional (3D) point cloud sequence that includes a set of reference 3D point cloud frames and a current 3D point cloud frame that is to be encoded;
  generate reference frame data comprising a feature set associated with 3D points of each reference 3D point cloud frame of the set of reference 3D point cloud frames;
  generate current frame data associated with 3D points of the current 3D point cloud frame,
   wherein the current frame data comprises a first set of features associated with an occupancy of the 3D points in the current 3D point cloud frame;
  predict a second set of features associated with the 3D points of the current 3D point cloud frame based on application of the first neural network predictor on the reference frame data;
  compute a set of residual features based on the first set of features and the second set of features;
  generate a set of quantized residual features based on application of a quantization scheme on the set of residual features; and
  generate a bitstream of encoded point cloud data for the current 3D point cloud frame based on application of an encoding scheme on the set of quantized residual features.

2. The first electronic device according to claim 1, wherein the second set of features are predicted further based on coordinate information associated with the 3D points of the current 3D point cloud frame.

3. The first electronic device according to claim 2, wherein the circuitry is further configured to encode the coordinate information based on an application of an octree-based encoder on the coordinate information, and
 the bitstream of encoded point cloud data includes the encoded coordinate information.

4. The first electronic device according to claim 1, wherein
 the memory is further configured to store a first Point Cloud Compression (PCC) encoder,
 the reference frame data is generated based on an application of the first PCC encoder on the set of reference 3D point cloud frames, and
 the current frame data is generated based on application of the first PCC encoder on the current 3D point cloud frame.

5. The first electronic device according to claim 1, wherein the feature set associated with 3D points of each reference 3D point cloud frame of the set of reference 3D point cloud frames comprises:
 reference features associated with an occupancy of the 3D points in a corresponding reference 3D point cloud frame of the set of reference 3D point cloud frames, and
 reference coordinate information associated with the 3D points of the corresponding reference 3D point cloud frame.

6. The first electronic device according to claim 1, wherein the set of reference 3D point cloud frames includes at least one reference 3D point cloud frame that precedes the current 3D point cloud frame or at least one reference 3D point cloud frame that succeeds the current 3D point cloud frame.

7. The first electronic device according to claim 1, wherein the circuitry is further configured to down sample the feature set associated with 3D points of each reference 3D point cloud frame of the set of reference 3D point cloud frames by at least one scaling factor.

8. A second electronic device, comprising:
 a memory configured to store a second neural network predictor; and
 circuitry configured to:
  receive a three-dimensional (3D) point cloud sequence that includes a set of reference 3D point cloud frames;
  generate reference frame data comprising a feature set associated with 3D points of each reference 3D point cloud frame of the set of reference 3D point cloud frames;
  receive a bitstream of encoded point cloud data associated with a current 3D point cloud frame that is to be decoded;
  predict a third set of features associated with 3D points of the current 3D point cloud frame based on an application of the second neural network predictor on the reference frame data;
  generate a fourth set of features associated with the 3D points of the current 3D point cloud frame based on the received bitstream of encoded point cloud data and the predicted third set of features; and
  reconstruct the current 3D point cloud frame based on application of a decoding scheme on the generated fourth set of features.

9. The second electronic device according to claim 8, wherein the received bitstream of encoded point cloud data further comprises encoded coordinate information associated with the 3D points of the current 3D point cloud frame.

10. The second electronic device according to claim 9, wherein the circuitry is further configured to generate coordinate information associated with the 3D points of the current 3D point cloud frame based on application of an octree-based decoder on the encoded coordinate information.

11. The second electronic device according to claim 10, wherein the third set of features are predicted further based on the generated coordinate information.

12. The second electronic device according to claim 8, wherein the memory is further configured to store a Point Cloud Compression (PCC) encoder,
wherein the reference frame data is generated based on an application of the PCC encoder on the set of reference 3D point cloud frames.

13. The second electronic device according to claim 8, wherein the feature set associated with 3D points of each reference 3D point cloud frame of the set of reference 3D point cloud frames comprises:
reference features associated with an occupancy of the 3D points in a corresponding reference 3D point cloud frame of the set of reference 3D point cloud frames, and
reference coordinate information associated with the 3D points of the corresponding reference 3D point cloud frame.

14. A method, comprising:
in a first electronic device:
receiving a three-dimensional (3D) point cloud sequence that includes a set of reference 3D point cloud frames and a current 3D point cloud frame that is to be encoded;
generating reference frame data comprising a feature set associated with 3D points of each reference 3D point cloud frame of the set of 3D point cloud reference frames;
generating current frame data associated with 3D points of the current 3D point cloud frame,
wherein the current frame data comprises a first set of features associated with an occupancy of the 3D points in the current 3D point cloud frame;
predicting a second set of features associated with the 3D points of the current 3D point cloud frame based on application of a first neural network predictor on the reference frame data;
computing a set of residual features based on the first set of features and the second set of features;
generating a set of quantized residual features based on application of a quantization scheme on the set of residual features; and
generating a bitstream of encoded point cloud data for the current 3D point cloud frame based on an application of an encoding scheme on the set of quantized residual features.

15. The method according to claim 14, wherein the second set of features are predicted further based on coordinate information associated with the 3D points of the current 3D point cloud frame.

16. The method according to claim 15, further comprising encoding the coordinate information based on application of an octree-based encoder on the coordinate information,
wherein the bitstream of encoded point cloud data includes the encoded coordinate information.

17. The method according to claim 14, wherein,
the reference frame data is generated based on an application of a first Point Cloud Compression (PCC) encoder on the set of reference 3D point cloud frames, and
the current frame data is generated based on application of the first PCC encoder on the current 3D point cloud frame.

18. The method according to claim 14, wherein the feature set associated with 3D points of each reference 3D point cloud frame of the set of reference 3D point cloud frames comprises:
reference features associated with an occupancy of the 3D points in a corresponding reference 3D point cloud frame of the set of reference 3D point cloud frames, and
reference coordinate information associated with the 3D points of the corresponding reference 3D point cloud frame.

19. The method according to claim 14, wherein the set of reference 3D point cloud frames includes at least one reference 3D point cloud frame that precedes the current 3D point cloud frame or at least one reference 3D point cloud frame that succeeds the current 3D point cloud frame.

20. The method according to claim 14, further comprising down sampling the feature set associated with 3D points of each reference 3D point cloud frame of the set of reference 3D point cloud frames by at least one scaling factor.

* * * * *